(12) United States Patent
Jang et al.

(10) Patent No.: US 12,216,333 B2
(45) Date of Patent: Feb. 4, 2025

(54) OPTICAL IMAGING SYSTEM

(71) Applicant: Samsung Electro-Mechanics Co., Ltd., Suwon-si (KR)

(72) Inventors: Dong Hyuk Jang, Suwon-si (KR); Byung Hyun Kim, Suwon-si (KR); Jae Hyuk Huh, Suwon-si (KR); Yong Joo Jo, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 18/541,843

(22) Filed: Dec. 15, 2023

(65) Prior Publication Data

US 2024/0134152 A1 Apr. 25, 2024

Related U.S. Application Data

(62) Division of application No. 17/320,565, filed on May 14, 2021, now Pat. No. 11,886,037.

(30) Foreign Application Priority Data

Sep. 24, 2020 (KR) ........................ 10-2020-0123436

(51) Int. Cl.
*G02B 9/04* (2006.01)
*G02B 9/12* (2006.01)
*G02B 13/00* (2006.01)

(52) U.S. Cl.
CPC ................. *G02B 9/04* (2013.01); *G02B 9/12* (2013.01); *G02B 13/003* (2013.01); *G02B 13/0035* (2013.01)

(58) Field of Classification Search
CPC ... G02B 9/04; G02B 9/10; G02B 9/12; G02B 13/003; G02B 13/0035; G02B 13/02
See application file for complete search history.

(56) References Cited

U.S. PATENT DOCUMENTS 10,324,274 B2 6/2019 Lee et al.
10,890,738 B2 1/2021 Yeh et al.
(Continued)

FOREIGN PATENT DOCUMENTS

CN 107367818 A 11/2017
CN 109541778 A 3/2019
(Continued)

OTHER PUBLICATIONS

Korean Office Action issued on Jan. 21, 2022, in counterpart Korean Patent Application No. 10-2020-0123436 (6 pages in English, 5 pages in Korean).
(Continued)

*Primary Examiner* — Jack Dinh
(74) *Attorney, Agent, or Firm* — NSIP Law

(57) ABSTRACT

An optical imaging system includes a plurality of lenses disposed along an optical axis from an object side of the optical imaging system toward an imaging plane of the optical imaging system. The lenses are separated from each other by respective air gaps along the optical axis between the lenses. The lenses include a first lens closest to the object side of the optical imaging system. The conditional expressions 1.5 mm<Gmax, TL<12.0 mm, and 0.15<R1/f are satisfied, where Gmax is a maximum air gap along the optical axis among all of the air gaps, TL is a length of the optical imaging system along the optical axis from an object-side surface of the first lens to the imaging plane, R1 is a radius of curvature of the object-side surface of the first lens, and f is a focal length of the optical imaging system.

6 Claims, 35 Drawing Sheets

(56) References Cited

U.S. PATENT DOCUMENTS

| | | |
|---|---|---|
| 11,372,211 B2 | 6/2022 | Guo et al. |
| 2005/0057679 A1 | 3/2005 | Isono |
| 2015/0116572 A1 | 4/2015 | Liao |
| 2015/0168677 A1 | 6/2015 | Lee et al. |
| 2016/0116717 A1 | 4/2016 | Kubota et al. |
| 2017/0242227 A1 | 8/2017 | Kitada et al. |
| 2017/0329105 A1 | 11/2017 | Lee et al. |
| 2018/0164544 A1 | 6/2018 | Kwak et al. |
| 2019/0094497 A1 | 3/2019 | Huang |
| 2019/0346661 A1 | 11/2019 | Yeh et al. |
| 2020/0209585 A1 | 7/2020 | Guo et al. |
| 2020/0209595 A1 | 7/2020 | Huang |
| 2020/0271902 A1 | 8/2020 | Dror et al. |
| 2020/0409035 A1 | 12/2020 | Teraoka |
| 2022/0026682 A1 | 1/2022 | Wu et al. |

FOREIGN PATENT DOCUMENTS

| | | |
|---|---|---|
| CN | 109856779 A | 6/2019 |
| CN | 110471160 A | 11/2019 |
| CN | 111679407 A | 9/2020 |
| JP | 2001-116995 A | 4/2001 |
| JP | 2014-89385 A | 5/2014 |
| JP | 2016-133620 A | 7/2016 |
| JP | 2017-146588 A | 8/2017 |
| JP | 6625780 B1 | 12/2019 |
| JP | 2020-109469 A | 7/2020 |
| JP | 2020-112762 A | 7/2020 |
| KR | 10-2015-0070858 A | 6/2015 |
| KR | 10-2018-0071948 A | 6/2018 |
| KR | 10-1932235 B1 | 12/2018 |
| TW | 1644140 B | 12/2018 |
| TW | 1684806 B | 2/2020 |
| WO | WO 2013/058111 A1 | 4/2013 |

OTHER PUBLICATIONS

Indian Office Action issued on Apr. 21, 2022, in counterpart Indian Patent Application No. 202114022078 (6 pages in English).

Korean Office Action issued on Jun. 9, 2022, in counterpart Korean Patent Application No. 10-2022-0033924 (7 pages in English, 5 pages in Korean).

Taiwanese Office Action issued on Aug. 19, 2022, in counterpart Taiwanese Patent Application No. 110117204 (9 pages in English, 7 pages in Chinese).

Korean Office Action issued on Aug. 24, 2022, in counterpart Korean Patent Application No. 10-2020-0123436 (5 pages in English, 4 pages in Korean).

Korean Office Action issued on Dec. 15, 2022, in counterpart Korean Patent Application No. 10-2022-0033924 (5 pages in English, 4 pages in Korean).

Korean Office Action issued on Feb. 22, 2023, in counterpart Korean Patent Application No. 10-2020-0123436 (5 pages in English, 4 pages in Korean).

Korean Office Action issued on Jun. 28, 2023, in counterpart Korean Patent Application No. 10-2020-0123436 (7 pages in English, 5 pages in Korean).

U.S. Appl. No. 17/320,565, filed May 14, 2021, Dong Hyuk Jang et al., Samsung Electro-Mechanics Co., Ltd.

Chinese Office Action issued on Mar. 7, 2024, in counterpart Chinese Patent Application No. 202110850551.7 (8 pages in English, 17 pages in Chinese).

Korean Office Action issued on May 16, 2024, in counterpart Korean Patent Application No. 10-2023-0124767 (7 pages in English, 6 pages in Korean).

OPTICAL IMAGING SYSTEM

CROSS-REFERENCE TO RELATED APPLICATIONS

This application is a division of application Ser. No. 17/320,565 filed on May 14, 2021, and claims the benefit under 35 USC 119(a) of Korean Patent Application No. 10-2020-0123436 filed on Sep. 24, 2020, in the Korean Intellectual Property Office, the entire disclosures of which are incorporated herein by reference for all purposes.

BACKGROUND

1. Field

This application relates to an optical imaging system having a variable length along an optical axis.

2. Description of Related Art

A mobile terminal device may include a camera module. For example, a mobile terminal device may include one or more camera modules. A camera module has a predetermined size. For example, the camera module has a size corresponding to a total track length (TL) between a lens closest to an object side of the camera module and an imaging plane (or an image sensor) of the camera module. A size of a camera module (that is, TL) is increased with the improvement of resolution or other performance of the camera module. An increase in the size of a camera module may cause a change in an exterior of a mobile terminal device. For example, the camera module may protrude outwardly from a surface of the mobile terminal device and provide an unpleasant user experience. In addition, an increase in the size of the camera module may result in frequent damage to the camera module. For example, since a significant portion of the camera module is exposed outside the mobile terminal device, the camera module may be easily damaged by external impacts

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a plurality of lenses sequentially disposed along an optical axis of the optical imaging system from an object side of the optical imaging system toward an imaging plane of the optical imaging system, the plurality of lenses being separated from each other by respective air gaps along the optical axis between the lenses, wherein the plurality of lenses include a first lens closest to the object side of the optical imaging system among all lenses of the optical imaging system, and the conditional expressions 1.5 mm<Gmax, TL<12.0 mm, and 0.15<R1/f are satisfied, where Gmax is a maximum air gap along the optical axis among all of the air gaps between the lenses, TL is a length of the optical imaging system along the optical axis from an object-side surface of the first lens to the imaging plane, R1 is a radius of curvature of the object-side surface of the first lens, and f is a focal length of the optical imaging system.

The first lens may have a positive refractive power.

The first lens may have a concave image-side surface.

The plurality of lenses may further include a second lens, a third lens, a fourth lens, and a fifth lens sequentially disposed in ascending numerical order along the optical axis on an image side of the first lens toward the imaging plane.

The conditional expression 0.001<D12/f<0.04 may be satisfied, where D12 is an air gap along the optical axis between the first lens and the second lens and is equal to a distance along the optical axis from an image-side surface of the first lens to an object-side surface of the second lens.

The conditional expression −3.0<f/f2+f/f3 may be satisfied, where f2 is a focal length of the second lens, and f3 is a focal length of the third lens.

The conditional expression 3.2<Nd2+Nd3 may be satisfied, where Nd2 is a refractive index of the second lens, and Nd3 is a refractive index of the third lens.

The conditional expression 0.6<TL/f<1.3 may be satisfied.

The plurality of lenses nay further include a last lens closest to the imaging plane among all lenses of the optical imaging system, and the conditional expression 0.12<BFL/f<0.26 may be satisfied, where BFL is a length along the optical axis from an image-side surface of the last lens to the imaging plane.

In another general aspect, an optical imaging system includes a first lens group including a first lens, the first lens being disposed closest to an object side of the optical imaging system among all lenses of the optical imaging system; and a second lens group disposed between the first lens group and an imaging plane of the optical imaging system, wherein the first lens group is configured to be movable to increase and decrease a distance between the first lens group and the second lens group, and a ratio TLs/TL of a length TLs of the optical imaging system along an optical axis of the optical imaging system from an object-side surface of the first lens to the imaging plane in a state in which the first lens group has been moved to decrease the distance between the first lens group and the second lens group to a length TL of the optical imaging system along the optical axis from the object-side surface of the first lens to the imaging plane in a state in which the first lens group has been moved to increase the distance between the first lens group and the second lens group is greater than 0.70 and less than 0.79.

The first lens may have a positive refractive power.

An air gap along the optical axis between the first lens group and the second lens group may greater than 1.9 mm and less 2.8 mm, and may be a maximum air gap among all air gaps along the optical axis between lenses in the optical imaging system.

The optical imaging system may further include a third lens group disposed between the second lens group and the imaging plane.

An air gap along the optical axis between the second lens group and the third lens group may be greater than 2.0 mm and less than 2.8 mm, and may be a maximum air gap among all air gaps along the optical axis between lenses in the optical imaging system.

An air gap along the optical axis between the first lens group and the second lens group may be smaller than an air gap along the optical axis between the second lens group and the third lens group, and the air gap along the optical axis between the second lens group and the third lens group may be a maximum air gap among all air gaps along the optical axis between lenses in the optical imaging system.

An air gap along the optical axis between the first lens group and the second lens group may be larger than an air gap along the optical axis between the second lens group and the third lens group, and the air gap along the optical axis between the first lens group and the second lens group may be a maximum air gap among all air gaps along the optical axis between lenses in the optical imaging system.

The first lens group further includes a second lens disposed on an image side of the first lens, the second lens group includes a third lens disposed on an image side of the second lens, and the third lens group includes a fourth lens disposed on an image side of the third lens and a fifth lens disposed on an image side of the fourth lens.

In another general aspect, an optical imaging system includes a first lens group disposed on an optical axis of the optical imaging system at an object side of the optical imaging system; and a second lens group disposed on the optical axis between the first lens group and an imaging plane of the optical imaging system, wherein the first lens group is configured to be movable between a first position at which a first length of the optical imaging system along the optical axis from an object-side surface of the first lens group to the imaging plane is TL, and a second position at which a second length of the optical imaging system along the optical axis from the object-side surface of the first lens group to the imaging plane is TLs, and TL and TLs satisfy the conditional expression 0.70<TLs/TL<0.79.

The first lens group being disposed at the first position may enable the optical imaging system to form an image of an object on the imaging plane, and the first lens group being disposed at the second position may prevent the optical imaging system from being able to form the image of the object on the imaging plane.

The optical imaging system may include a plurality of lenses sequentially disposed along the optical axis from the object side of the optical imaging system toward the imaging plane and divided into the first lens group and the second lens group, the plurality of lenses may be separated from each other by respective air gaps along the optical axis, and an air gap between the first lens group and the second lens group at the first position of the first lens group may be a maximum air gap Gmax among all of the air gaps between the plurality of lenses and may satisfy the conditional expression 1.5 mm<Gmax.

The first lens group may include a total of five lenses, and the second lens group may include a total of one lens.

The first lens group may include a total of six lenses, and the second lens group may include a total of one lens.

The first lens group may include a total of seven lenses, and the second lens group may include a total of one lens.

The first lens group may include a total of four lenses, and the second lens group may include a total of two lenses.

The first lens group may include a total of five lenses, and the second lens group may include a total of two lenses.

The first lens group may include a total of six lenses, and the second lens group may include a total of two lenses.

The first lens group may include a total of four lenses, and the second lens group may include a total of three lenses.

The optical imaging system may further include a third lens group disposed between the second lens group and the imaging plane, wherein the first lens group may include a total of two lenses, the second lens group may include a total of one lens, and the third lens group may include a total of two lenses.

In another general aspect, a camera module includes the optical imaging system described above; a first lens barrel in which the first lens group is disposed; and a second lens barrel in which the second lens group is disposed, wherein the first lens barrel is configured to be movable to move the first lens group between the first position and the second position.

In another general aspect, a mobile terminal device includes the camera module described above.

In another general aspect, an optical imaging system includes a first lens group disposed on an optical axis of the optical imaging system at an object side of the optical imaging system; a second lens group disposed on the optical axis between the first lens group and an imaging plane of the optical imaging system; and a third lens group disposed on the optical axis between the second lens group and the imaging plane, wherein the first lens group and the second lens group are configured to be movable between respective first positions at which a first length of the optical imaging system along the optical axis from an object-side surface of the first lens group to the imaging plane is TL, and respective second positions at which a second length of the optical imaging system along the optical axis from the object-side surface of the first lens group to the imaging plane is TLs, and TL and TLs satisfy the conditional expression 0.70<TLs/TL<0.79.

The first lens group and the second lens group being disposed at the respective first positions may enable the optical imaging system to form an image of an object on the imaging plane, and the first lens group and the second lens group being disposed at the respective second positions may prevent the optical imaging system from being able to form the image of the object on the imaging plane.

The optical imaging system may include a plurality of lenses sequentially disposed along the optical axis from the object side of the optical imaging system toward the imaging plane and divided into the first lens group, the second lens group, and the third lens group, the plurality of lenses may be separated from each other by respective air gaps along the optical axis, and an air gap between the second lens group and the third lens group at the respective first positions of the first lens group and the second lens group may be a maximum air gap Gmax among all of the air gaps between the plurality of lenses and may satisfy the conditional expression 1.5 mm<Gmax.

The first lens group may include a total of two lenses, the second lens group may include a total of one lens, and the third lens group may include a total of two lenses.

In another general aspect, a camera module includes the optical imaging system described above; a first lens barrel in which the first lens group is disposed; a second lens barrel in which the second lens group is disposed; and a third lens barrel in which the third lens group is disposed, wherein the first lens barrel and the second lens barrel are configured to be movable to move the first lens group and the second lens group between the respective first positions and the respective second positions.

In another general aspect, a mobile terminal device includes the camera module described above.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
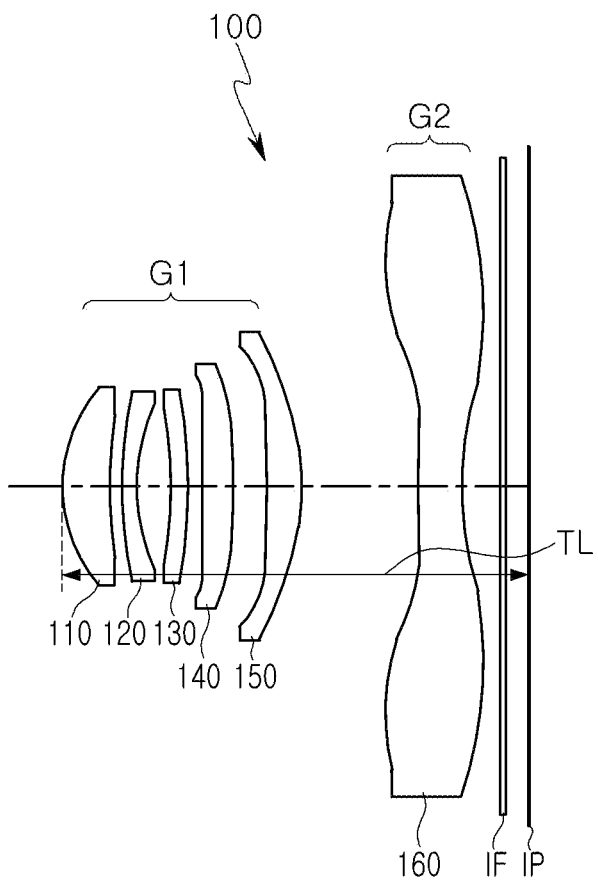
FIG. 1 is a view illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Use herein of the word "may" in describing the various examples, e.g., as to what an example may include or implement, means that at least one example exists in which such a feature is included or implemented, but not all examples are limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Furthermore, although the examples described herein have a variety of configurations, other configurations are possible as will be apparent after an understanding of the disclosure of this application.

An optical imaging system includes five, six, seven, or eight lenses sequentially disposed along an optical axis of the optical imaging system from an object side of the optical imaging system toward an imaging plane of the optical imaging system. A first lens is a lens closest to the object side of the optical imaging system, and a fifth, sixth, seventh, or eighth lens is a lens closest to the imaging plane. The lenses are spaced apart from each other by respective air gaps along the optical axis.

In each lens, an object-side surface is a surface of the lens closest to the object side of the optical imaging system, and an image-side surface is a surface of the lens closest to the imaging plane.

Unless stated otherwise, a reference to a shape of a lens surface refers to a shape of a paraxial region of the lens surface. A paraxial region of a lens surface is a central portion of the lens surface surrounding and including an optical axis of the lens surface in which light rays incident to the lens surface make a small angle θ to the optical axis, and the approximations sin θ≈θ, tan θ≈θ, and cos θ≈1 are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as being convex, the entire object-side surface of the lens may not be convex, and a peripheral region of the object-side surface of the lens may be concave. Also, even though the image-side surface of the lens may be described as being concave, the entire image-side surface of the lens may not be concave, and a peripheral region of the image-side surface of the lens may be convex.

Gmax is a maximum air gap among all air gaps between the lenses of the optical imaging system.

TL is a length of the optical imaging system along the optical axis from an object-side surface of the first lens to the imaging plane in an inactive mode or image-capturing mode of the optical imaging system in which the optical imaging system is capable of capturing an image.

TLs is a length of the optical imaging system along the optical axis from the object-side surface of the first lens to the imaging plane in an inactive mode of the optical imaging system in which the optical imaging system is incapable of capturing an image.

BFL is a length along the optical axis from an image-side surface of the last lens (the fifth, sixth, seventh, or eighth lens) to the imaging plane.

IMGHT is a maximum effective image height of the optical imaging system and is equal to one half of a diagonal length of a maximum effective imaging area of an imaging surface of an image sensor with the imaging surface being disposed at the imaging plane. Stated another way, IMGHT is equal to one half of a maximum effective area of the imaging plane corresponding to the maximum effective imaging area of the imaging surface of the image sensor.

f is a focal length of the optical imaging system, and f1, f2, f3, f4, f5, f6, f7, and f8 are respective focal lengths of first to eighth lenses of the optical imaging system.

Fno is an f-number of the optical imaging system, and is equal to the focal length f of the optical imaging system divided by an entrance pupil diameter of the optical imaging system.

Radiuses of curvature of the surfaces of the lenses, thickness of the lenses and other elements, air gaps between the lenses, distances between the lenses and the other elements, the focal length f of the optical imaging system, the focal lengths f1, f2, f3, f4, f5, f6, f7, and f8 of the first to eighth lenses, Gmax, TL, TLs, BFL and IMGHT are expressed in millimeters (mm), although other units of measurement may be used. Fno, refractive indexes of the lenses, and Abbe numbers of the lenses are dimensionless quantities.

The thicknesses of the lenses and the other elements, the air gaps between the lenses, the distances between the lenses and the other elements, Gmax, TL, TLs, and BFL are measured along the optical axis of the optical imaging system.

One example of an optical imaging system may include a plurality of lenses. For example, the optical imaging system may include five lenses, six lenses, seven lenses, or eight lenses. The optical imaging system may be configured such that a plurality of lenses are sequentially disposed along an optical axis of the optical imaging system from an object side of the optical imaging system to an imaging plane of the optical imaging system. The plurality of lenses may be spaced apart from each other by air gaps. For example, a length TL of the optical imaging system (a length along an optical axis between an object-side surface of a first lens closest to an object side of the optical imaging system and an imaging plane of the optical imaging system) may be less than 12.0 mm. The optical imaging system may be configured to change the length TL. For example, the optical imaging system may be configured to decrease the length TL by decreasing an air gap between two of the lenses of the optical imaging system. The optical imaging system may be configured to significantly decrease the length TL of the optical imaging system. For example, a maximum air gap Gmax among all air gaps between the lenses of the optical imaging system may be greater than 1.5 mm. A focal length f of the optical imaging system and a radius of curvature R1 of an object-side surface of a first lens of the optical imaging system may satisfy a predetermined conditional expression. For example, the optical imaging system may satisfy any one or any combination of any two or more of Conditional Expressions 1 to 3 below.

$$1.5 \text{ mm} < Gmax \quad \text{(Conditional Expression 1)}$$

$$TL < 12.0 \quad \text{(Conditional Expression 2)}$$

$$0.15 < R1/f \quad \text{(Conditional Expression 3)}$$

Alternatively, f and R1 may satisfy Conditional Expression 4 below.

$$0.15 < R1/f < 0.5 \quad \text{(Conditional Expression 4)}$$

The first lens of the optical imaging system may have a predetermined refractive power. For example, the first lens may have a positive refractive power. One surface of the first lens may be concave. For example, the first lens may have a concave image-side surface.

Another example of an optical imaging system may include a plurality of lens groups. For example, the optical imaging system may include a first lens group and a second lens group. The first lens group may include a first lens disposed closest to an object side of the optical imaging system. However, the first lens group is not limited to only the first lens. The first lens group may be moveable to increase and decrease a distance between the first lens group and the second lens group. For example, a distance between the first lens group and the second lens group may be increased in an active mode of the optical imaging system, and may be decreased in an inactive mode of the optical imaging system. Accordingly, a length of the optical imaging system may be contracted by a predetermined ratio in the inactive mode. For example, a ratio (TLs/TL) of a length TLs of the optical imaging system in the inactive mode of the optical imaging system to a length TL of the optical imaging system in the active mode may be greater than 0.65 and less than 0.79. Alternatively, TLs/TL may be greater than 0.70 and less than 0.79. In other words, TLs and TL may satisfy one of Conditional Expressions 5 and 6 below.

$$0.65 < TLs/TL < 0.79 \quad \text{(Conditional Expression 5)}$$

$$0.70 < TLs/TL < 0.79 \quad \text{(Conditional Expression 6)}$$

The first lens group and the second lens group may be spaced apart from each other by an air gap. For example, the air gap between the first lens group and the second lens group may be greater than 1.9 mm and less than 2.8 mm, and may be a maximum air gap Gmax in the optical imaging system.

The optical imaging system may further include a third lens group. For example, a third lens group including one or more lenses may be provided on an image side of the second lens group. The second lens group and the third lens group may be spaced apart from each other by an air gap. For example, the air gap between the second lens group and the third lens group may be greater than 2.0 mm and less than 2.8 mm, and may be the maximum air gap Gmax in the optical imaging system. The air gap between the first lens and the second lens group and the air gap between the second lens group and the third lens group may have a predetermined size relationship to each other. For example, the air gap between the first lens group and the second lens group may be smaller than the air gap between the second lens group and the third lens group. Alternatively, the air gap between the first lens group and the second lens group may be larger than the air gap between the second lens group and the third lens group.

Each of the first lens group, the second lens group, and the third lens group may include at least one lens. For example, the first lens group may include a first lens and a second lens sequentially disposed along an optical axis of the optical imaging system in ascending numerical order from an object side of the first lens group toward an imaging plane of the optical imaging system, the second lens group may include a third lens disposed on the optical axis on an image side of the second lens, and the third lens group may include a fourth lens and a fifth lens sequentially disposed along the optical axis in ascending numeral order on an image side of the third lens from an object side of the first lens group to the imaging plane.

In the description below, components of the optical imaging system will be described in detail.

The optical imaging system includes five or more lenses. For example, the optical imaging system may include a first lens, a second lens, a third lens, a fourth lens, and a fifth lens sequentially disposed along an optical axis of the optical imaging system in ascending numerical order from an object side of the optical imaging system toward an imaging plane of the optical imaging system. However, the optical imaging system is not limited to only five lenses. For example, the optical imaging system may include a first lens, a second lens, a third lens, a fourth lens, a fifth lens, and a sixth lens sequentially disposed along the optical axis of the optical imaging system in ascending numerical order from the object side of the optical imaging system toward the imaging plane of the optical imaging system. Alternatively, the optical imaging system may include a first lens, a second lens, a third lens, a fourth lens, a fifth lens, a sixth lens, and a seventh lens sequentially disposed along the optical axis of the optical imaging system in ascending numerical order from the object side of the optical imaging system toward the imaging plane of the optical imaging system. Alternatively, the optical imaging system may include a first lens, a second lens, a third lens, a fourth lens, a fifth lens, a sixth lens, a seventh lens, and an eighth lens sequentially disposed along the optical axis of the optical imaging system in ascending numerical order from an object side of the optical imaging system toward the imaging plane of the optical imaging system.

The first lens has a predetermined refractive power. For example, the first lens may have a positive refractive power. One surface of the first lens may be concave. For example, the first lens may have a concave image-side surface. However, the shape of the first lens is not limited to such a shape. For example, the first lens may have a convex object-side surface and a convex image-side surface. The first lens has a predetermined refractive index. For example, the first lens may have a refractive index greater than or equal to 1.5 and less than 1.6. The first lens may have a predetermined focal length. For example, the focal length of the first lens may be within a range of 3.0 mm to 9.0 mm.

The second lens has a predetermined refractive power. For example, the second lens may have a negative refractive power. One surface of the second lens may be concave. For example, the second lens may have a concave image-side surface. The second lens has a predetermined refractive index. For example, the second lens may have a refractive index greater than or equal to 1.6 and less than 1.7. The second lens may have a predetermined focal length. For example, the focal length of the second lens may be within a range of −60 mm to −7.0 mm.

The third lens has a predetermined refractive power. For example, the third lens may have a positive refractive power or a negative refractive power. One surface of the third lens may be concave. For example, the third lens may have a concave object-side surface or a concave image-side surface. The third lens may have a predetermined refractive index. For example, the third lens may have a refractive index greater than or equal to 1.53 and less than 1.7.

The fourth lens has a predetermined refractive power. For example, the fourth lens may have a positive refractive power or a negative refractive power. One surface of the fourth lens may be concave. For example, the fourth lens may have a concave object-side surface or a concave image-side surface. The fourth lens has a predetermined refractive index. For example, the fourth lens may have a refractive index greater than or equal to 1.53 and less than 1.7.

The fifth lens has a predetermined refractive power. For example, the fifth lens may have a positive refractive power or a negative refractive power. One surface of the fifth lens may be convex, or both surfaces of the fifth lens may be concave. For example, a fifth lens having a positive refractive power may have a convex object-side surface or a convex image-side surface, and a fifth lens having a negative refractive power may have a concave object-side surface and a concave image-side surface. The fifth lens may have a predetermined refractive index. For example, the fifth lens may have a refractive index greater than or equal to 1.5 and less than 1.7.

The sixth lens has a predetermined refractive power. For example, the sixth lens may have a positive refractive power or a negative refractive power. One surface of the sixth lens may be convex. For example, the sixth lens may have a convex object-side surface or a convex image-side surface. The sixth lens may have a predetermined refractive index. For example, the sixth lens may have a refractive index greater than or equal to 1.5 and less than 1.6.

The seventh lens has a predetermined refractive power. For example, the seventh lens may have a positive refractive power or a negative refractive power. One surface of the seventh lens may be concave. For example, the seventh lens may have a concave object-side surface or a concave image-side surface. However, the seventh lens disposed on an image side of the sixth lens having a negative refractive power may have a convex object-side surface and a convex image-side surface. The seventh lens may have a predetermined refractive index. For example, the seventh lens may have a refractive index greater than or equal to 1.5 and less than 1.6.

The eighth lens has a predetermined refractive power. For example, the eighth lens may have a negative refractive power. One surface of the eighth lens may be concave. For example, the eighth lens may have a concave image-side surface. The eighth lens may have a predetermined refractive index. For example, the eighth lens may have a refractive index greater than or equal to 1.5 and less than 1.6.

The optical imaging system may include a plastic lens. For example, among five or more lenses of the optical imaging system, at least one lens may be made of a plastic material.

The optical imaging system may include an aspherical lens. For example, among the five or more lenses of the optical imaging system, at least one lens may have an aspherical object-side surface and an aspherical image-side surface. Each aspherical surface is defined by Equation 1 below:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} + Lr^{22} + Mr^{24} + Nr^{26} + Or^{26} + Pr^{30} \quad (1)$$

In Equation 1, c is a curvature of a lens surface and is equal to a reciprocal of a radius of curvature of the lens surface at an optical axis of the lens surface, k is a conic constant, r is a distance from any point on the lens surface to the optical axis of the lens surface in a direction perpendicular to the optical axis of the lens surface, A, B, C, D, E, F, G, H, J, L, M, N, O, and P are aspheric constants, and Z (also known as sag) is a distance in a direction parallel to the optical axis of the lens surface from the point on the lens surface at the distance r from the optical axis of the lens surface to a tangential plane perpendicular to the optical axis and intersecting a vertex of the lens surface.

The optical imaging system may further include a filter disposed between a last lens and the imaging plane. The filter may block certain wavelengths of incident light entering the optical imaging system. For example, the filter may block infrared wavelengths of the incident light. The optical imaging system may further include an image sensor having an imaging surface disposed at the imaging plane. The image sensor may be configured to convert an optical image formed by the optical imaging system on the imaging surface into an electrical signal. The image sensor may be a charge-coupled device (CCD) image sensor, but is not limited thereto.

The optical imaging system may satisfy any one or any combination of any two or more of Conditional Expressions 7 to 12 below.

| | |
|---|---|
| $0.001 < D12/f < 0.04$ | (Conditional Expression 7) |
| $-3.0 < f/f2 + f/f3$ | (Conditional Expression 8) |
| $3.2 < Nd2 + Nd3$ | (Conditional Expression 9) |
| $0.6 < TL/f < 1.3$ | (Conditional Expression 10) |
| $0.12 < BFL/f < 0.26$ | (Conditional Expression 11) |
| $Fno < 2.5$ | (Conditional Expression 12) |

In Conditional Expressions 7 to 12, D12 is a distance along an optical axis of the optical imaging system from an image-side surface of a first lens to an object-side surface of a second lens, f is a focal length of the optical imaging system, f2 is a focal length of the second lens, f3 is a focal length of a third lens, Nd2 is a refractive index of the second lens, Nd3 is a refractive index of the third lens, TL is a length along the optical axis between an object-side surface of the first lens and an imaging plane of the optical imaging system in an active mode of the optical imaging system, BFL is a length along the optical axis between an image-side surface of a last lens closest to the imaging plane and the imaging plane, and Fno is an f-number of the optical imaging system, and is equal to the focal length f of the optical imaging system divided by an entrance pupil diameter of the optical imaging system.

The optical imaging system may further satisfy any one or any combination of any two or more of Conditional Expressions 13 to 15 below.

$0.20 < Gmax/TL < 0.30$ (Conditional Expression 13)

$-3.0 < f/f2 + f/f3 < 0$ (Conditional Expression 14)

$3.2 < Nd2 + Nd3 < 3.5$ (Conditional Expression 15)

In Conditional Expression 15, Gmax is a maximum air gap among all air gaps between the lenses of the optical imaging system.

In the description below, various examples of an optical imaging system will be described.

Figure 2:
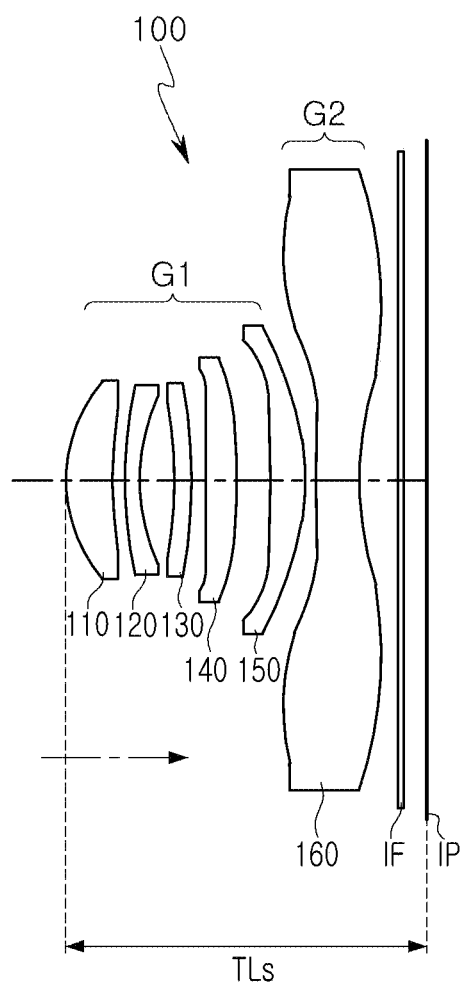
FIG. 2 is a view illustrating a contracted state of the optical imaging system illustrated in FIG. 1.
Figure 3:
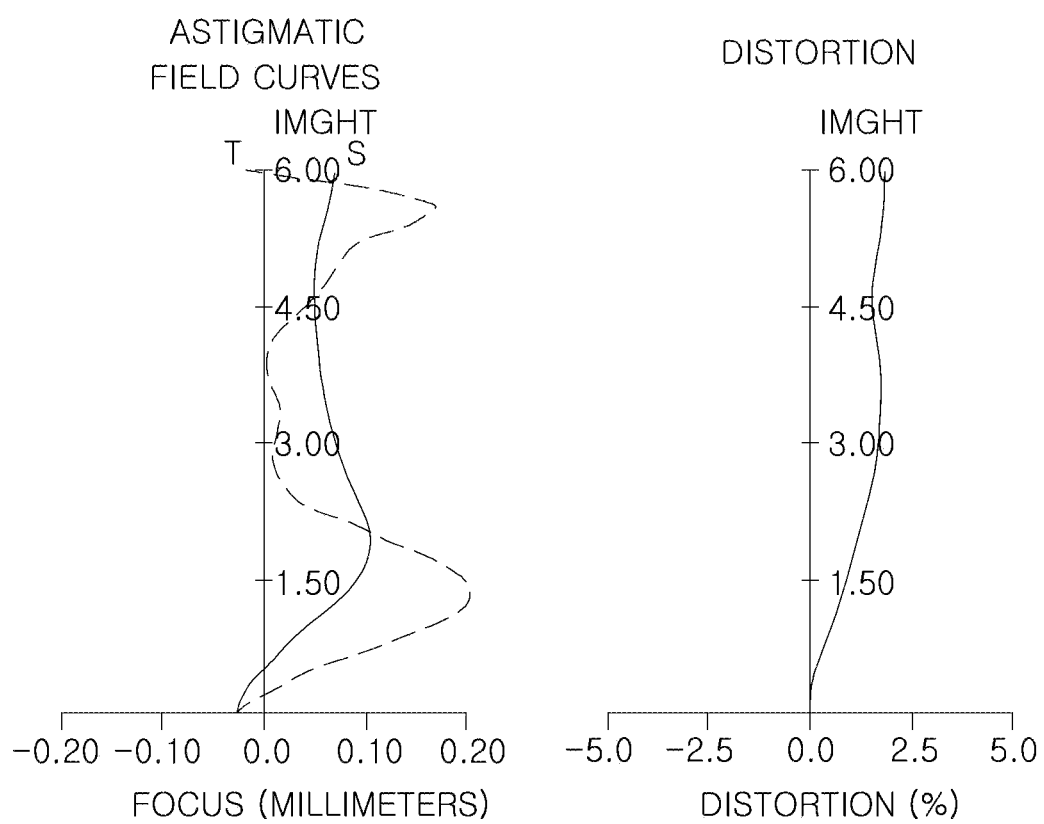
FIG. 3 is a view illustrating aberration curves of the optical imaging system illustrated in FIG. 1.

FIG. 1 is a view illustrating a first example of an optical imaging system, FIG. 2 is a view illustrating a contracted state of the optical imaging system illustrated in FIG. 1, and FIG. 3 is a view illustrating aberration curves of the optical imaging system illustrated in FIG. 1.

Referring to FIG. 1, an optical imaging system 100 may include a first lens 110, a second lens 120, a third lens 130, a fourth lens 140, a fifth lens 150, a sixth lens 160, a filter IF, and an imaging plane IP.

The first lens 110 may have a positive refractive power. The first lens 110 may have a convex object-side surface and a concave image-side surface. The second lens 120 may have a negative refractive power. The second lens 120 may have a convex object-side surface and a concave image-side surface. The third lens 130 may have a negative refractive power. The third lens 130 may have a convex object-side surface and a concave image-side surface. The fourth lens 140 may have a positive refractive power. The fourth lens 140 may have a convex object-side surface and a concave image-side surface. The fifth lens 150 may have a positive refractive power. The fifth lens 150 may have a convex object-side surface and a convex image-side surface. An inflection point may be formed on the object-side surface of the fifth lens 150. The sixth lens 160 may have a negative refractive power. The sixth lens 160 may have a convex object-side surface and a concave image-side surface. Inflection points may be formed on the object-side surface and the image-side surface of the sixth lens 160.

The optical imaging system 100 may include a plurality of lens groups. For example, the first to fifth lenses 110 to 150 may constitute a first lens group G1, and the sixth lens 160 may constitute a second lens group G2. An air gap between the first lens group G1 and the second lens group G2 may be a maximum air gap Gmax in the optical imaging system 100. In other words, the air gap between the fifth lens 150 and the sixth lens 160 may be greater than all other air gaps between the lenses in the optical imaging system 100.

As illustrated in FIG. 2, the first lens group G1 may be moved closer to the second lens group G2 to decrease a length of the optical imaging system 100. A positional movement of the first lens group G1 may be selectively performed. For example, the first lens group G1 may be disposed to provide a maximum distance to the second lens group G2 in an active mode of the optical imaging system 100 (a mode of being capable of capturing an image), and may be disposed to provide a minimum distance to the second lens group G2 in an inactive mode of the optical imaging system 100 (a mode of being incapable of capturing an image). A length of the optical imaging system 100 (a distance between the object-side surface of the first lens 110 and the imaging plane IP) may vary depending on the position of the first lens group G1. For example, a length TL of the optical imaging system 100 in the active mode may be greater than a length TLs of the optical imaging system 100 in the inactive mode. Thus, the optical imaging system 100 may mitigate an issue in which a camera module protrudes outwardly from a mobile terminal device when the camera module is not being used.

Characteristics of the lenses and the other elements of the optical imaging system 100 are listed in Table 1 below, and aspherical constants of the surfaces of the lenses of the optical imaging system 100 are listed in Table 2 below.

The bold value 2.200 in the Thickness/Distance column in Table 1 is the maximum air gap Gmax, which is the air gap between the first lens group G1 and the second lens group G2, and is also the air gap between the fifth lens 150 and the sixth lens 160.

TABLE 1

| Surface No. | Element | Radius of Curvature | Thickness/ Distance | Refractive Index | Abbe Number |
|---|---|---|---|---|---|
| S1 | | Infinity | 0.000 | | |
| S2 | First | 3.05 | 0.896 | 1.544 | 56.1 |
| S3 | Lens | 14.19 | 0.208 | | |
| S4 | Second | 7.42 | 0.300 | 1.671 | 19.4 |
| S5 | Lens | 4.36 | 0.631 | | |
| S6 | Third | 88.42 | 0.300 | 1.614 | 25.9 |
| S7 | Lens | 14.34 | 0.299 | | |
| S8 | Fourth | 12.27 | 0.548 | 1.567 | 38.0 |
| S9 | Lens | 17.79 | 0.704 | | |
| S10 | Fifth | 48.24 | 0.663 | 1.544 | 56.1 |
| S11 | Lens | −4.68 | 2.200 | | |
| S12 | Sixth | 6.29 | 0.700 | 1.544 | 56.1 |
| S13 | Lens | 2.29 | 0.815 | | |
| S14 | Filter | Infinity | 0.110 | 1.518 | 64.2 |
| S15 | | Infinity | 0.398 | | |
| S16 | Imaging Plane | Infinity | | | |

TABLE 2

| Surface No. | S2 | S3 | S4 | S5 | S6 | S7 |
|---|---|---|---|---|---|---|
| k | −0.141 | −1.829 | 1.451 | 4.066 | −97.321 | 1.804 |
| A | −0.021 | −0.018 | −0.001 | −0.027 | 0.023 | −0.016 |
| B | 0.099 | 0.092 | −0.061 | 0.181 | −0.286 | 0.014 |
| C | −0.259 | −0.383 | 0.166 | −0.997 | 1.287 | −0.064 |
| D | 0.428 | 0.954 | −0.195 | 3.297 | −3.686 | 0.165 |
| E | −0.479 | −1.543 | −0.055 | −7.127 | 7.042 | −0.292 |
| F | 0.374 | 1.713 | 0.542 | 10.646 | −9.352 | 0.357 |
| G | −0.208 | −1.349 | −0.885 | −11.341 | 8.863 | −0.305 |
| H | 0.083 | 0.767 | 0.820 | 8.757 | −6.073 | 0.185 |
| J | −0.024 | −0.315 | −0.496 | −4.920 | 3.014 | −0.080 |
| L | 0.005 | 0.093 | 0.203 | 1.992 | −1.072 | 0.025 |
| M | −0.001 | −0.019 | −0.056 | −0.566 | 0.266 | −0.005 |
| N | 0.000 | 0.003 | 0.010 | 0.107 | −0.044 | 0.001 |
| O | 0.000 | 0.000 | −0.001 | −0.012 | 0.004 | 0.000 |
| P | 0.000 | 0.000 | 0.000 | 0.001 | 0.000 | 0.000 |

| Surface No. | S8 | S9 | S10 | S11 | S12 | S13 |
|---|---|---|---|---|---|---|
| k | −1.840 | 2.691 | 0.000 | 0.000 | −1.130 | −0.888 |
| A | −0.029 | −0.008 | −0.003 | 0.004 | −0.051 | −0.061 |
| B | 0.031 | −0.073 | −0.015 | −0.008 | 0.010 | 0.015 |
| C | −0.044 | 0.184 | 0.029 | 0.012 | −0.001 | −0.003 |
| D | 0.027 | −0.278 | −0.033 | −0.011 | 0.000 | 0.000 |
| E | 0.018 | 0.280 | 0.025 | 0.006 | 0.000 | 0.000 |
| F | −0.053 | −0.196 | −0.013 | −0.002 | 0.000 | 0.000 |
| G | 0.052 | 0.099 | 0.005 | 0.001 | 0.000 | 0.000 |
| H | −0.031 | −0.036 | −0.001 | 0.000 | 0.000 | 0.000 |
| J | 0.012 | 0.010 | 0.000 | 0.000 | 0.000 | 0.000 |
| L | −0.003 | −0.002 | 0.000 | 0.000 | 0.000 | 0.000 |
| M | 0.001 | 0.000 | 0.000 | 0.000 | 0.000 | 0.000 |
| N | 0.000 | 0.000 | 0.000 | 0.000 | 0.000 | 0.000 |
| O | 0.000 | 0.000 | 0.000 | 0.000 | 0.000 | 0.000 |
| P | 0.000 | 0.000 | 0.000 | 0.000 | 0.000 | 0.0 |

Figure 4:
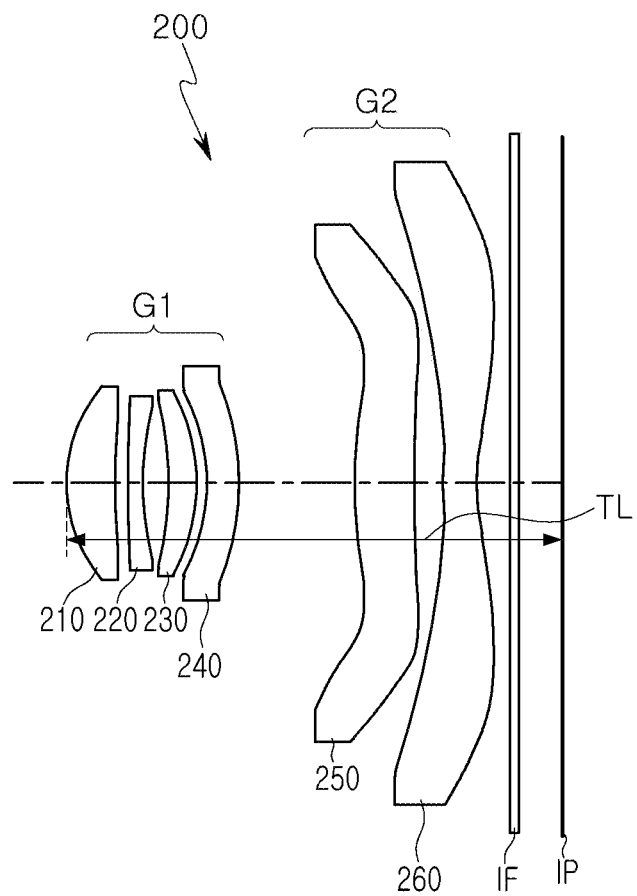
FIG. 4 is a view illustrating a second example of an optical imaging system.
Figure 5:
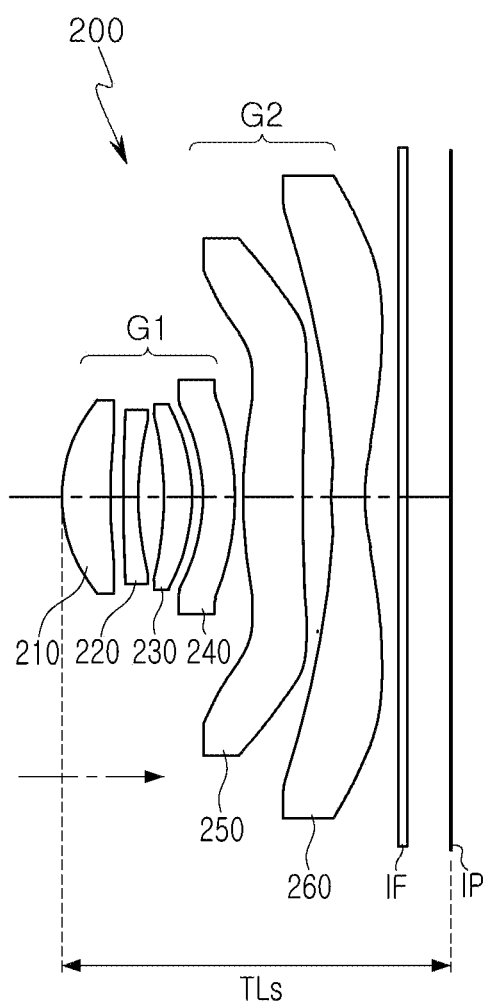
FIG. 5 is a view illustrating a contracted state of the optical imaging system illustrated in FIG. 4.
Figure 6:
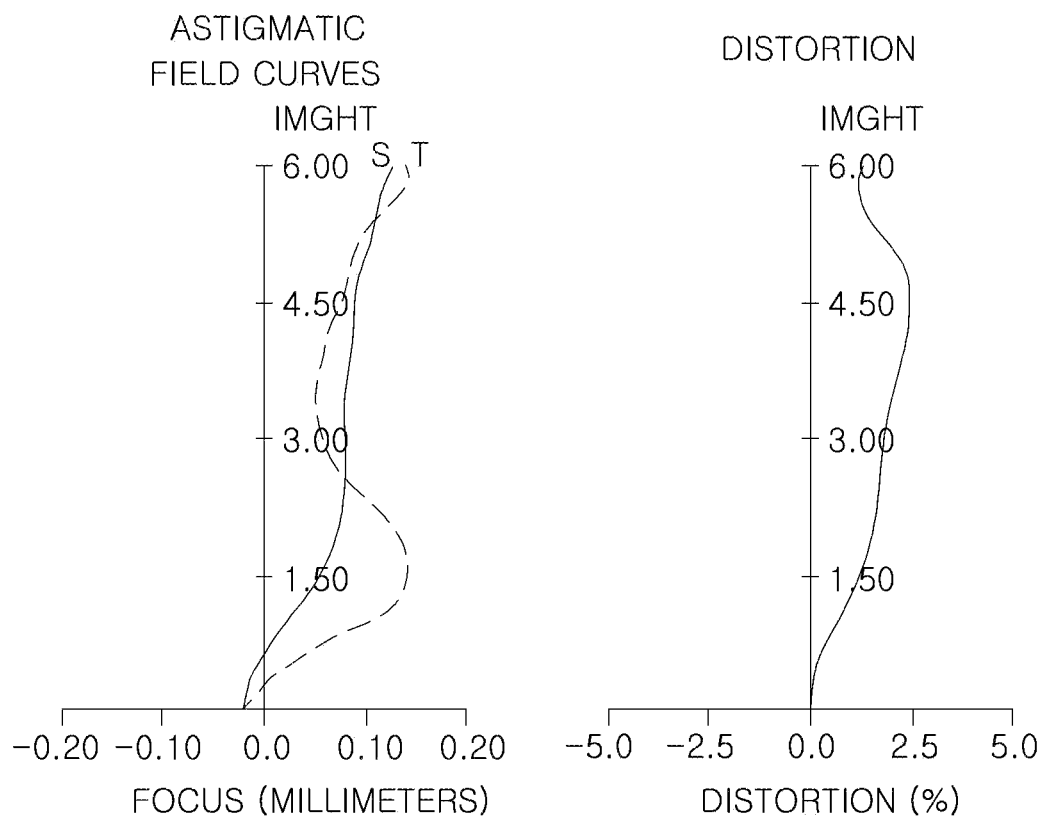
FIG. 6 is a view illustrating aberration curves of the optical imaging system illustrated in FIG. 4.

FIG. 4 is a view illustrating a second example of an optical imaging system, FIG. 5 is a view illustrating a contracted state of the optical imaging system illustrated in FIG. 4, and FIG. 6 is a view illustrating aberration curves of the optical imaging system illustrated in FIG. 4.

Referring to FIG. 4, an optical imaging system 200 may include a first lens 210, a second lens 220, a third lens 230, a fourth lens 240, a fifth lens 250, a sixth lens 260, a filter IF, and an imaging plane IP.

The first lens 210 may have a positive refractive power. The first lens 210 may have a convex object-side surface and a concave image-side surface. The second lens 220 may have a negative refractive power. The second lens 220 may have a convex object-side surface and a concave image-side surface. The third lens 230 may have a positive refractive power. The third lens 230 may have a concave object-side surface and a convex image-side surface. The fourth lens 240 may have a negative refractive power. The fourth lens 240 may have a concave object-side surface and a convex image-side surface. The fifth lens 250 may have a positive refractive power. The fifth lens 250 may have a convex object-side surface and a concave image-side surface. Inflection points may be formed on the object-side surface and the image-side surface of the fifth lens 250. The sixth lens 260 may have a negative refractive power. The sixth lens 260 may have a convex object-side surface and a concave image-side surface. Inflection points may be formed on the object-side surface and the image-side surface of the sixth lens 260.

The optical imaging system 200 may include a plurality of lens groups. For example, the first lens 210 to the fourth lens 240 may constitute a first lens group G1, and the fifth and sixth lenses 250 and 260 may constitute a second lens group G2. An air gap between the first lens group G1 and the second lens group G2 may be a maximum air gap Gmax in the optical imaging system 200. In other words, the air gap between the fourth lens 240 and the fifth lens 250 may be greater than all other air gaps between the lenses in the optical imaging system 200.

As illustrated in FIG. 5, the first lens group G1 may be moved closer to the second lens group G2 to decrease a length of the optical imaging system 200. Such a positional movement of the first lens group G1 may be selectively performed. For example, the first lens group G1 may be disposed to provide a maximum distance to the second lens group G2 in an active mode of the optical imaging system 200 (a mode of being capable of capturing an image), and may be disposed to provide a minimum distance to the second lens G2 in an inactive mode of the optical imaging system 200 (a mode of being incapable of capturing an image). A length of the optical imaging system 200 (a distance between the object-side surface of the first lens 210 and the imaging plane IP) may vary depending on the position of the first lens group G1. For example, a length TL of the optical imaging system 200 in the active mode may be greater than a length TLs of the optical imaging system 200 in the inactive mode. Thus, the optical imaging system 200 may mitigate an issue in which a camera module protrudes outwardly from a mobile terminal device when the camera module is not being used.

Characteristics of the lenses and the other elements of the optical imaging system 200 are listed in Table 3 below, and aspherical constants of the surfaces of the lenses of the optical imaging system 200 are listed in Table 4 below.

The bold value 2.000 in the Thickness/Distance column in Table 3 is the maximum air gap Gmax, which is the air gap between the first lens group G1 and the second lens group G2, and is also the air gap between the fourth lens 240 and the fifth lens 250.

TABLE 3

| Surface No. | Element | Radius of Curvature | Thickness/ Distance | Refractive Index | Abbe Number |
|---|---|---|---|---|---|
| S1 | | Infinity | 0.000 | | |
| S2 | First | 2.57 | 0.881 | 1.544 | 56.1 |
| S3 | Lens | 14.48 | 0.222 | | |
| S4 | Second | 65.84 | 0.250 | 1.614 | 25.9 |
| S5 | Lens | 5.59 | 0.458 | | |
| S6 | Third | −59.72 | 0.451 | 1.567 | 38.0 |
| S7 | Lens | −8.61 | 0.184 | | |
| S8 | Fourth | −5.50 | 0.594 | 1.651 | 21.5 |
| S9 | Lens | −6.35 | 2.000 | | |
| S10 | Fifth | 6.46 | 1.047 | 1.535 | 56.1 |
| S11 | Lens | 63.16 | 0.476 | | |
| S12 | Sixth | 13.63 | 0.543 | 1.535 | 56.1 |
| S13 | Lens | 2.75 | 0.624 | | |
| S14 | Filter | Infinity | 0.110 | 1.518 | 64.2 |
| S15 | | Infinity | 0.784 | | |
| S16 | Imaging Plane | Infinity | | | |

TABLE 4

| Surface No. | S2 | S3 | S4 | S5 | S6 | S7 |
|---|---|---|---|---|---|---|
| k | −0.057 | 50.994 | 99.000 | 2.366 | 71.197 | 24.692 |
| A | −0.006 | −0.025 | −0.056 | −0.084 | −0.041 | −0.032 |
| B | 0.038 | 0.057 | 0.026 | 0.375 | 0.060 | −0.084 |
| C | −0.107 | −0.272 | 0.184 | −1.747 | −0.118 | 0.497 |
| D | 0.207 | 1.010 | −0.610 | 6.101 | −0.234 | −1.521 |
| E | −0.285 | −2.473 | 1.059 | −14.674 | 2.334 | 3.152 |
| F | 0.296 | 4.125 | −1.104 | 24.767 | −7.312 | −4.659 |
| G | −0.238 | −4.834 | 0.582 | −29.938 | 13.374 | 5.016 |
| H | 0.150 | 4.051 | 0.090 | 26.205 | −16.089 | −3.966 |
| J | −0.074 | −2.439 | −0.409 | −16.621 | 13.256 | 2.299 |
| L | 0.028 | 1.046 | 0.336 | 7.557 | −7.544 | −0.964 |
| M | −0.008 | −0.312 | −0.152 | −2.398 | 2.919 | 0.285 |
| N | 0.001 | 0.061 | 0.041 | 0.504 | −0.734 | −0.056 |
| O | 0.000 | −0.007 | −0.006 | −0.063 | 0.108 | 0.007 |
| P | 0.000 | 0.000 | 0.000 | 0.004 | −0.007 | 0.000 |

| Surface No. | S8 | S9 | S10 | S11 | S12 | S13 |
|---|---|---|---|---|---|---|
| k | 7.616 | −65.071 | −7.984 | −35.744 | −12.206 | −0.813 |
| A | −0.051 | −0.053 | −0.007 | 0.001 | −0.039 | −0.049 |
| B | 0.060 | 0.019 | 0.006 | 0.004 | 0.004 | 0.007 |
| C | −0.189 | 0.022 | −0.006 | −0.005 | 0.000 | 0.000 |
| D | 0.512 | −0.079 | 0.004 | 0.003 | 0.000 | 0.000 |
| E | −0.924 | 0.123 | −0.001 | −0.001 | 0.000 | 0.000 |
| F | 1.146 | −0.123 | 0.000 | 0.000 | 0.000 | 0.000 |
| G | −1.004 | 0.085 | 0.000 | 0.000 | 0.000 | 0.000 |
| H | 0.631 | −0.042 | 0.000 | 0.000 | 0.000 | 0.000 |
| J | −0.285 | 0.015 | 0.000 | 0.000 | 0.000 | 0.000 |
| L | 0.092 | −0.004 | 0.000 | 0.000 | 0.000 | 0.000 |
| M | −0.020 | 0.001 | 0.000 | 0.000 | 0.000 | 0.000 |
| N | 0.003 | 0.000 | 0.000 | 0.000 | 0.000 | 0.000 |
| O | 0.000 | 0.000 | 0.000 | 0.000 | 0.000 | 0.000 |
| P | 0.000 | 0.000 | 0.000 | 0.000 | 0.000 | 0.0 |

Figure 7:
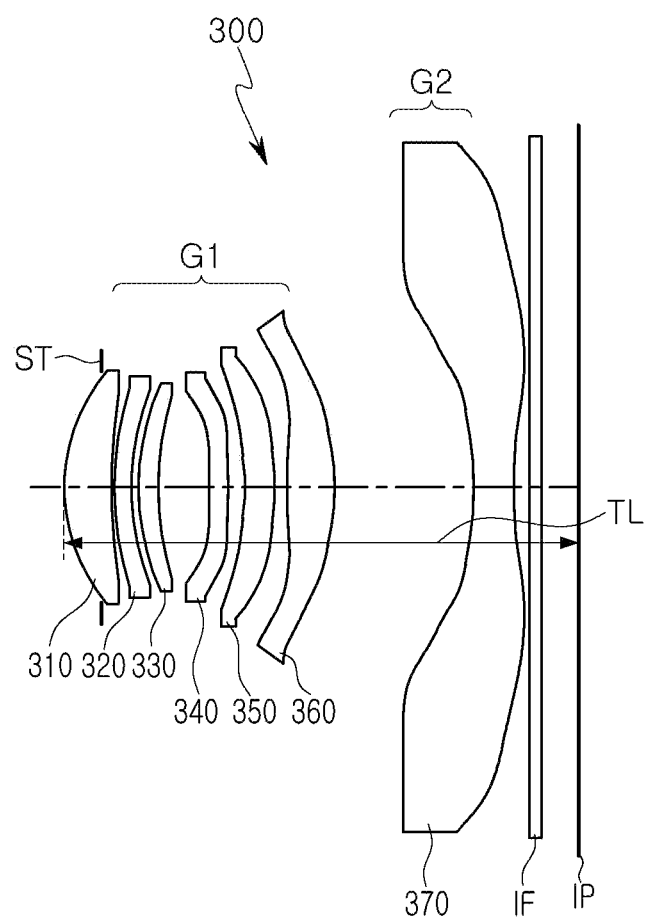
FIG. 7 is a view illustrating a third example of an optical imaging system.
Figure 8:
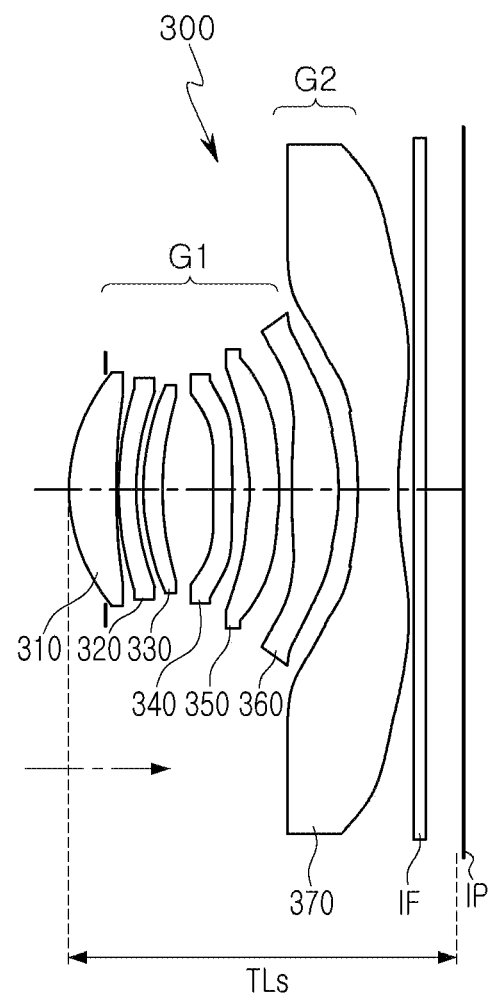
FIG. 8 is a view illustrating a contracted state of the optical imaging system illustrated in FIG. 7.
Figure 9:
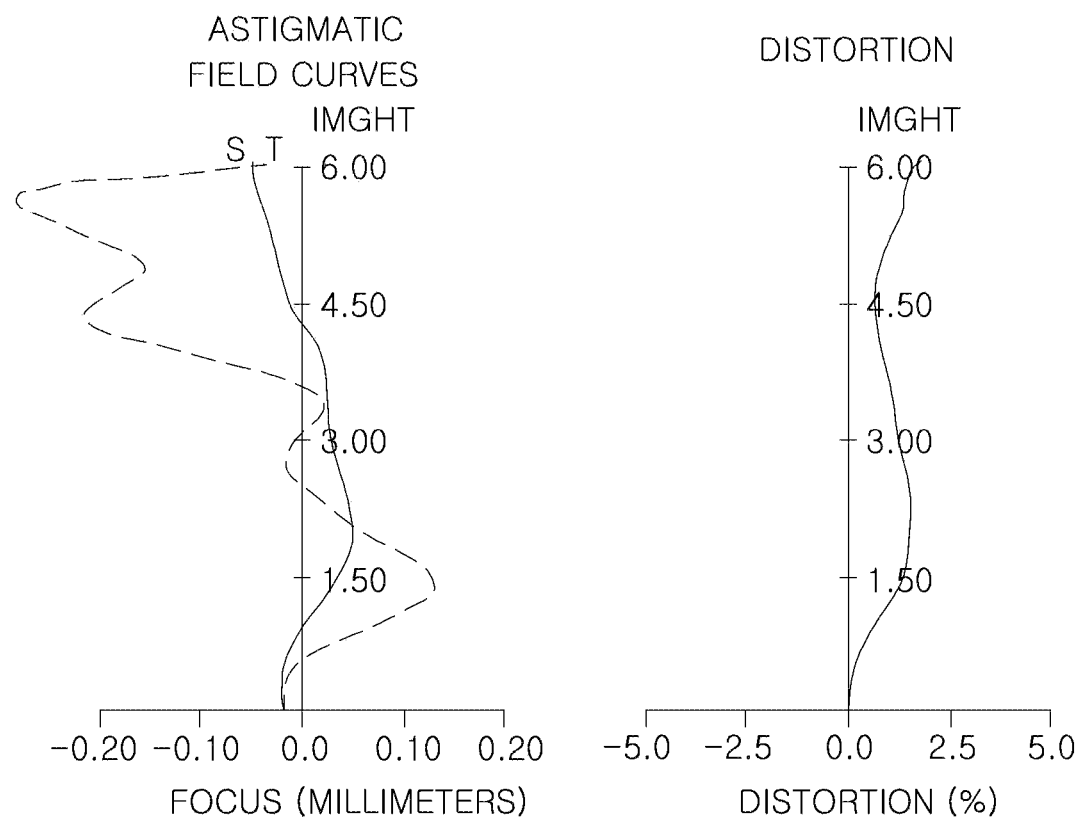
FIG. 9 is a view illustrating aberration curves of the optical imaging system illustrated in FIG. 7.

FIG. 7 is a view illustrating a third example of an optical imaging system, FIG. 8 is a view illustrating a contracted state of the optical imaging system illustrated in FIG. 7, and FIG. 9 is a view illustrating aberration curves of the optical imaging system illustrated in FIG. 7.

Referring to FIG. 7, an optical imaging system 300 may include a first lens 310, a second lens 320, a third lens 330, a fourth lens 340, a fifth lens 350, a sixth lens 360, a seventh lens 370, a filter IF, and an imaging plane IP.

The first lens 310 may have a positive refractive power. The first lens 310 may have a convex object-side surface and a concave image-side surface. The second lens 320 may have a negative refractive power. The second lens 320 may have a convex object-side surface and a concave image-side surface. The third lens 330 may have a positive refractive power. The third lens 330 may have a convex object-side surface and a concave image-side surface. The fourth lens 340 may have a negative refractive power. The fourth lens 340 may have a concave object-side surface and a concave image-side surface. The fifth lens 350 may have a negative refractive power. The fifth lens 350 may have a concave object-side surface and a concave image-side surface. An inflection point may be formed on the object-side surface or the image-side surface of the fifth lens 350. The sixth lens 360 may have a positive refractive power. The sixth lens 360 may have a convex object-side surface and a convex image-side surface. Inflection points may be formed on the object-side surface and the image-side surface of the sixth lens 360. The seventh lens 370 may have a negative refractive power. The seventh lens 370 may have a concave object-side surface and a concave image-side surface. Inflection points may be formed on the object-side surface and the image-side surface of the seventh lens 370.

The optical imaging system 300 may include a plurality of lens groups. For example, the first lens 310 to the sixth lens 360 may constitute a first lens group G1, and the seventh lens 370 may constitute a second lens group G2. An air gap between the first lens group G1 and the second lens group G2 may be a maximum air gap Gmax in the optical imaging system 300. In other words, the air gap between the sixth lens 360 and the seventh lens 370 may be greater than all other air gaps between lenses in the optical imaging system 300.

As illustrated in FIG. 8, the first lens group G1 may be moved closer to the second lens group G2 to decrease a length of the optical imaging system 300. Such a positional movement of the first lens group G1 may be selectively performed. For example, the first lens group G1 may be disposed to provide a maximum distance to the second lens group G2 in an active mode of the optical imaging system 300 (a mode of being capable of capturing an image), and may be disposed to provide a minimum distance to the second lens group G2 in an inactive mode of the optical imaging system 300 (a mode of being incapable of capturing an image). A length of the optical imaging system 300 (a distance between the object-side surface of the first lens 310 and the imaging plane IP) may vary depending on the position of the first lens group G1. For example, a length TL of the optical imaging system 300 in the active mode may be greater than a length TLs of the optical imaging system 300 in the inactive mode. Thus, the optical imaging system 300 may mitigate an issue in which a camera module protrudes outwardly from a mobile terminal device when the camera module is not being used.

Characteristics of the lenses and the other elements of the optical imaging system 300 are listed in Table 5 below, and aspherical constants of the surfaces of the lenses of the optical imaging system 300 are listed in Table 6 below.

The bold value 2.400 in the Thickness/Distance column in Table 5 is the maximum air gap Gmax, which is the air gap between the first lens group G1 and the second lens group G2, and is also the air gap between the sixth lens 360 and the seventh lens 370.

TABLE 5

| Surface No. | Element | Radius of Curvature | Thickness/ Distance | Refractive Index | Abbe Number |
|---|---|---|---|---|---|
| S1 |  | Infinity | 0.000 |  |  |
| S2 | First | 3.15 | 0.799 | 1.544 | 56.1 |
| S3 | Lens | 8.51 | 0.044 |  |  |
| S4 | Second | 4.42 | 0.250 | 1.671 | 19.4 |
| S5 | Lens | 3.22 | 0.172 |  |  |
| S6 | Third | 4.09 | 0.344 | 1.544 | 56.1 |
| S7 | Lens | 5.76 | 0.909 |  |  |
| S8 | Fourth | −23.28 | 0.311 | 1.671 | 19.4 |
| S9 | Lens | 100.38 | 0.237 |  |  |
| S10 | Fifth | −23.98 | 0.522 | 1.544 | 56.1 |
| S11 | Lens | 9.83 | 0.254 |  |  |
| S12 | Sixth | 7.13 | 0.847 | 1.544 | 56.1 |
| S13 | Lens | −3.76 | 2.400 |  |  |
| S14 | Seventh | −7.67 | 0.660 | 1.544 | 56.1 |
| S15 | Lens | 5.76 | 0.282 |  |  |
| S16 | Filter | Infinity | 0.210 | 1.518 | 64.2 |
| S17 |  | Infinity | 0.569 |  |  |
| S18 | Imaging Plane | Infinity |  |  |  |

TABLE 6

| Surface No. | S2 | S3 | S4 | S5 | S6 | S7 | S8 |
|---|---|---|---|---|---|---|---|
| k | −0.008 | 0.276 | −0.003 | 0.005 | 0.007 | 0.053 | 98.443 |
| A | −0.007 | −0.020 | −0.009 | 0.002 | −0.017 | −0.003 | 0.008 |
| B | 0.096 | 0.105 | −0.026 | −0.119 | 0.060 | −0.044 | −0.308 |
| C | −0.417 | −0.394 | 0.138 | 0.546 | −0.311 | 0.323 | 1.461 |
| D | 0.999 | 0.905 | −0.432 | −1.611 | 0.972 | −1.228 | −4.356 |
| E | −1.517 | −1.380 | 0.844 | 3.176 | −2.004 | 2.900 | 8.542 |
| F | 1.566 | 1.462 | −1.101 | −4.350 | 2.852 | −4.575 | −11.528 |
| G | −1.141 | −1.105 | 1.001 | 4.242 | −2.883 | 5.018 | 11.018 |
| H | 0.597 | 0.605 | −0.647 | −2.982 | 2.104 | −3.902 | −7.575 |
| J | −0.226 | −0.240 | 0.299 | 1.514 | −1.112 | 2.162 | 3.760 |
| L | 0.061 | 0.068 | −0.098 | −0.549 | 0.422 | −0.847 | −1.336 |
| M | −0.012 | −0.014 | 0.022 | 0.139 | −0.112 | 0.229 | 0.331 |
| N | 0.001 | 0.002 | −0.003 | −0.023 | 0.020 | −0.041 | −0.054 |
| O | 0.000 | 0.000 | 0.000 | 0.002 | −0.002 | 0.004 | 0.005 |
| P | 0.000 | 0.000 | 0.000 | 0.000 | 0.000 | 0.000 | 0.000 |

| Surface No. | S9 | S10 | S11 | S12 | S13 | S14 | S15 |
|---|---|---|---|---|---|---|---|
| k | −98.751 | 7.766 | 0.891 | −0.631 | −0.015 | −0.164 | −0.031 |
| A | 0.026 | −0.024 | −0.059 | −0.004 | 0.019 | −0.006 | −0.003 |
| B | −0.268 | −0.088 | −0.030 | −0.048 | −0.009 | −0.007 | −0.009 |
| C | 0.792 | 0.187 | 0.033 | 0.068 | 0.007 | 0.004 | 0.004 |
| D | −1.581 | −0.195 | 0.028 | −0.071 | −0.006 | −0.001 | −0.001 |
| E | 2.210 | 0.115 | −0.092 | 0.054 | 0.004 | 0.000 | 0.000 |
| F | −2.211 | −0.024 | 0.103 | −0.030 | −0.002 | 0.000 | 0.000 |

TABLE 6-continued

| | | | | | | | |
|---|---|---|---|---|---|---|---|
| G | 1.601 | −0.020 | −0.071 | 0.012 | 0.000 | 0.000 | 0.000 |
| H | −0.844 | 0.021 | 0.033 | −0.004 | 0.000 | 0.000 | 0.000 |
| J | 0.324 | −0.010 | −0.010 | 0.001 | 0.000 | 0.000 | 0.000 |
| L | −0.089 | 0.003 | 0.002 | 0.000 | 0.000 | 0.000 | 0.000 |
| M | 0.017 | −0.001 | 0.000 | 0.000 | 0.000 | 0.000 | 0.000 |
| N | −0.002 | 0.000 | 0.000 | 0.000 | 0.000 | 0.000 | 0.000 |
| O | 0.000 | 0.000 | 0.000 | 0.000 | 0.000 | 0.000 | 0.000 |
| P | 0.000 | 0.000 | 0.000 | 0.000 | 0.000 | 0.000 | 0.0 |

Figure 10:
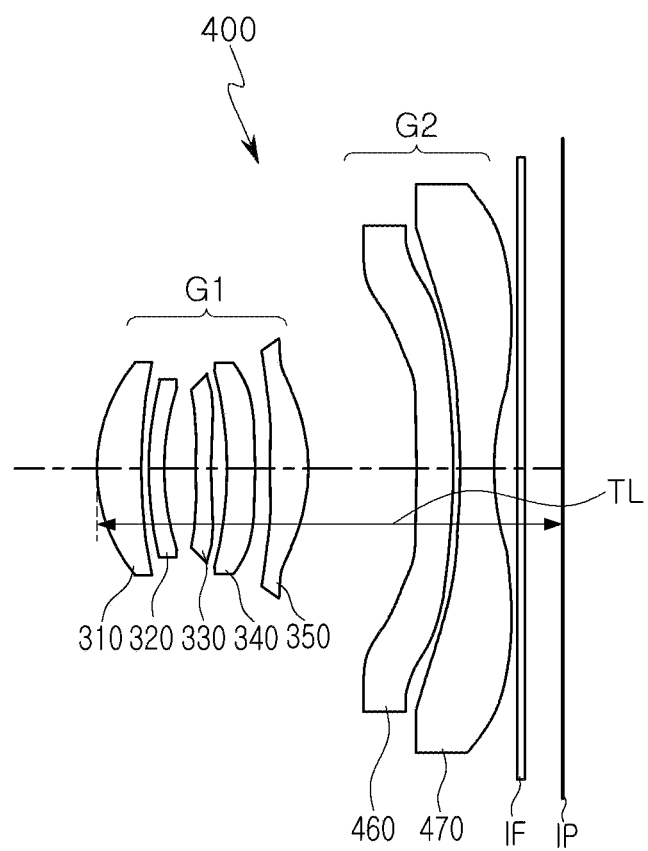
FIG. 10 is a view illustrating a fourth example of an optical imaging system.
Figure 11:
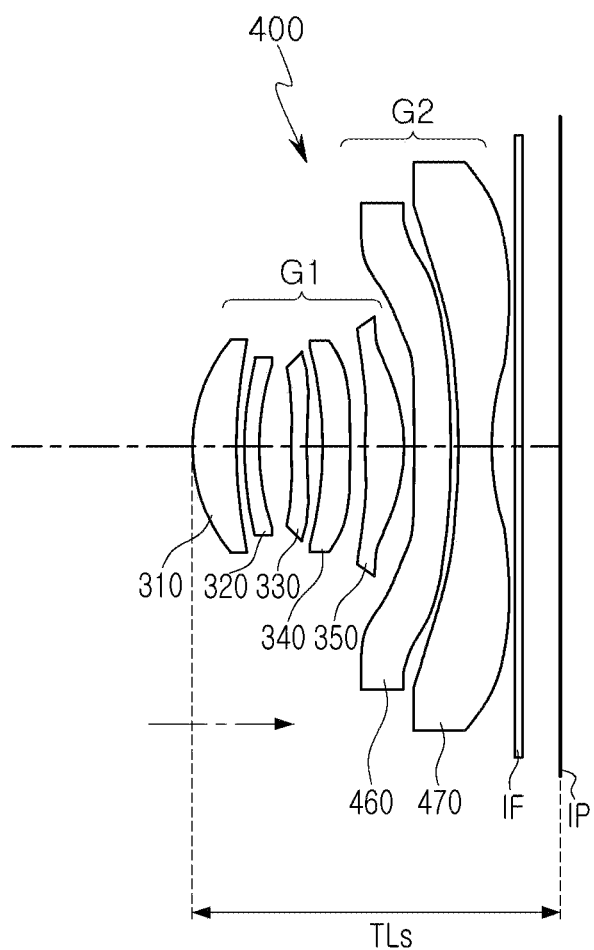
FIG. 11 is a view illustrating a contracted state of the optical imaging system illustrated in FIG. 10.
Figure 12:
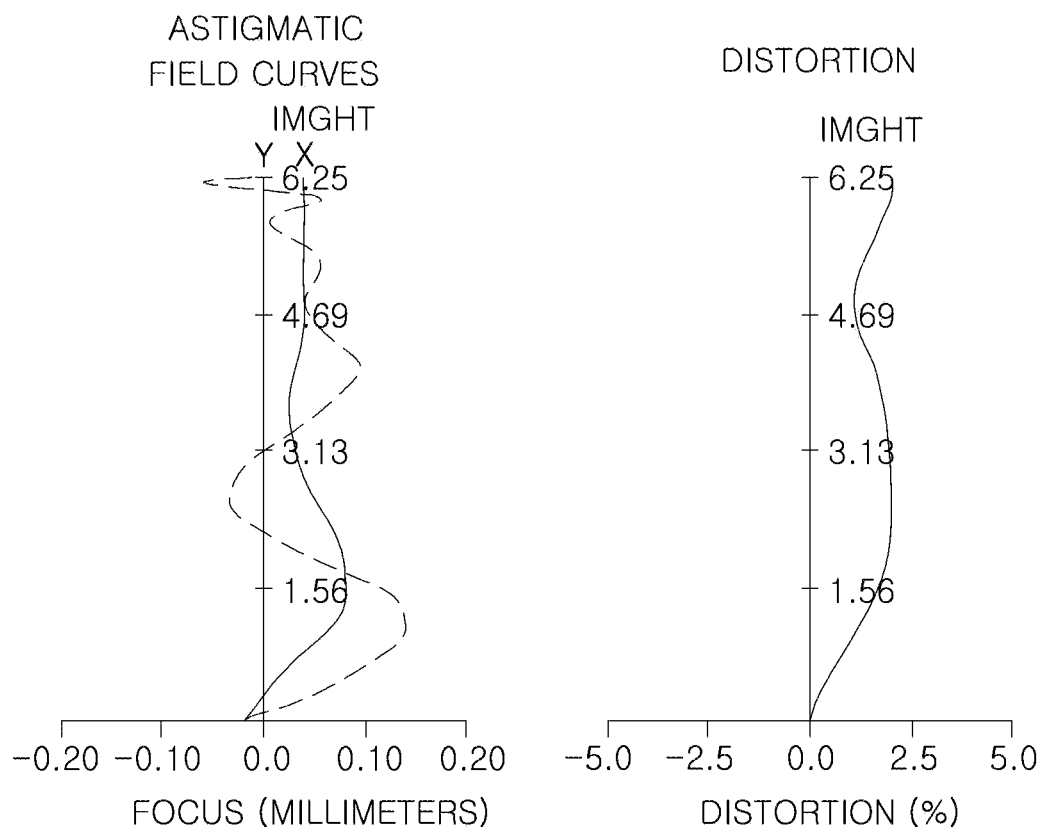
FIG. 12 is a view illustrating aberration curves of the optical imaging system illustrated in FIG. 10.

FIG. 10 is a view illustrating a fourth example of an optical imaging system, FIG. 11 is a view illustrating a contracted state of the optical imaging system illustrated in FIG. 10, and FIG. 12 is a view illustrating aberration curves of the optical imaging system illustrated in FIG. 10.

Referring to FIG. 10, an optical imaging system 400 may include a first lens 410, a second lens 420, a third lens 430, a fourth lens 440, a fifth lens 450, a sixth lens 460, a seventh lens 470, a filter IF, and an imaging plane IP.

The first lens 410 may have a positive refractive power. The first lens 410 may have a convex object-side surface and a concave image-side surface. The second lens 420 may have a negative refractive power. The second lens 420 may have a convex object-side surface and a concave image-side surface. The third lens 430 may have a negative refractive power. The third lens 430 may have a convex object-side surface and a concave image-side surface. The fourth lens 440 may have a negative refractive power. The fourth lens 440 may have a concave object-side surface and a concave image-side surface. The fifth lens 450 may have a positive refractive power. The fifth lens 450 may have a convex object-side surface and a convex image-side surface. Inflection points may be formed on the object-side surface and the image-side surface of the fifth lens 450. The sixth lens 460 may have a positive refractive power. The sixth lens 460 may have a concave object-side surface and a convex image-side surface. Inflection points may be formed on the object-side surface and the image-side surface of the sixth lens 460. The seventh lens 470 may have a negative refractive power. The seventh lens 470 may have a convex object-side surface and a concave image-side surface. Inflection points may be formed on the object-side surface and the image-side surface of the seventh lens 470.

The optical imaging system 400 may include a plurality of lens groups. For example, the first lens 410 to the fifth lenses 450 may constitute a first lens group G1, and the sixth lens 460 and the seventh lens 470 may constitute a second lens group G2. An air gap between the first lens group G1 and the second lens group G2 may be a maximum air gap Gmax in the optical imaging system 400. In other words, the air gap between the fifth lens 450 and the sixth lens 460 may be greater than all other air gaps between the lenses in the optical imaging system 400.

As illustrated in FIG. 11, the first lens group G1 may be moved closer to the second lens group G2 to decrease a length of the optical imaging system 400. Such a positional movement of the first lens group G1 may be selectively performed. For example, the first lens group G1 may be disposed to provide a maximum distance to the second lens group G2 in an active mode of the optical imaging system 400 (a mode of being capable of capturing an image), and may be disposed to provide a minimum distance to the second lens group G2 in an inactive mode of the optical imaging system 400 (a mode of being incapable of capturing an image). A length of the optical imaging system 400 (a distance between the object-side surface of the first lens 410 and the imaging plane IP) may vary depending on the position of the first lens group G1. For example, a length TL of the optical imaging system 400 in the active mode may be greater than a length TLs of the optical imaging system 400 in the inactive mode. Thus, the optical imaging system 400 may mitigate an issue in which a camera module protrudes outwardly from a mobile terminal device when the camera module is not being used.

Characteristics of the lenses and the other elements of the optical imaging system 400 are listed in Table 7 below, and aspherical constants of the surfaces of the lenses of the optical imaging system are listed in Table 8 below.

The bold value 2.050 in the Thickness/Distance column in Table 7 is the maximum air gap Gmax, which is the air gap between the first lens group G1 and the second lens group G2, and is also the air gap between the fifth lens 450 and the sixth lens 460.

TABLE 7

| Surface No. | Element | Radius of Curvature | Thickness/ Distance | Refractive Index | Abbe Number |
|---|---|---|---|---|---|
| S1 | | Infinity | 0.000 | | |
| S2 | First | 3.22 | 0.873 | 1.544 | 56.1 |
| S3 | Lens | 13.98 | 0.109 | | |
| S4 | Second | 6.53 | 0.280 | 1.671 | 19.4 |
| S5 | Lens | 4.61 | 0.653 | | |
| S6 | Third | 14.43 | 0.280 | 1.671 | 19.4 |
| S7 | Lens | 10.30 | 0.283 | | |
| S8 | Fourth | −16.11 | 0.504 | 1.567 | 38.0 |
| S9 | Lens | 16.18 | 0.275 | | |
| S10 | Fifth | 14.19 | 0.761 | 1.544 | 56.1 |
| S11 | Lens | −3.67 | 2.050 | | |
| S12 | Sixth | −137.59 | 0.700 | 1.535 | 56.1 |
| S13 | Lens | −38.65 | 0.088 | | |
| S14 | Seventh | 6.71 | 0.600 | 1.535 | 56.1 |
| S15 | Lens | 2.22 | 0.475 | | |
| S16 | Filter | Infinity | 0.110 | 1.518 | 64.2 |
| S17 | | Infinity | 0.740 | | |
| S18 | Imaging Plane | Infinity | | | |

TABLE 8

| Surface No. | S2 | S3 | S4 | S5 | S6 | S7 | S8 |
|---|---|---|---|---|---|---|---|
| k | −0.083 | −2.429 | −0.841 | 3.663 | −98.825 | 16.784 | −14.618 |
| A | 0.003 | −0.019 | −0.024 | −0.031 | 0.009 | −0.001 | −0.069 |
| B | −0.002 | 0.068 | 0.047 | 0.130 | −0.184 | −0.087 | 0.171 |
| C | −0.013 | −0.224 | −0.163 | −0.705 | 0.738 | 0.290 | −0.393 |

TABLE 8-continued

| | | | | | | | |
|---|---|---|---|---|---|---|---|
| D | 0.054 | 0.510 | 0.406 | 2.481 | −2.009 | −0.612 | 0.629 |
| E | −0.104 | −0.795 | −0.661 | −5.856 | 3.752 | 0.830 | −0.681 |
| F | 0.119 | 0.876 | 0.719 | 9.611 | −5.008 | −0.767 | 0.506 |
| G | −0.091 | −0.697 | −0.523 | −11.233 | 4.882 | 0.498 | −0.263 |
| H | 0.048 | 0.405 | 0.243 | 9.466 | −3.504 | −0.229 | 0.096 |
| J | −0.018 | −0.171 | −0.060 | −5.763 | 1.848 | 0.074 | −0.025 |
| L | 0.005 | 0.052 | −0.002 | 2.510 | −0.707 | −0.017 | 0.005 |
| M | −0.001 | −0.011 | 0.006 | −0.762 | 0.191 | 0.002 | −0.001 |
| N | 0.000 | 0.002 | −0.002 | 0.153 | −0.034 | 0.000 | 0.000 |
| O | 0.000 | 0.000 | 0.000 | −0.018 | 0.004 | 0.000 | 0.000 |
| P | 0.000 | 0.000 | 0.000 | 0.001 | 0.000 | 0.000 | 0.000 |

| Surface No. | S9 | S10 | S11 | S12 | S13 | S14 | S15 |
|---|---|---|---|---|---|---|---|
| k | −24.213 | 0.000 | 0.000 | −96.775 | −56.984 | −1.568 | −0.873 |
| A | −0.060 | −0.028 | 0.007 | −0.017 | −0.096 | −0.166 | −0.091 |
| B | 0.006 | 0.006 | −0.022 | 0.014 | 0.088 | 0.106 | 0.033 |
| C | 0.050 | 0.002 | 0.042 | −0.007 | −0.038 | −0.040 | −0.009 |
| D | −0.106 | −0.016 | −0.048 | 0.002 | 0.010 | 0.010 | 0.002 |
| E | 0.122 | 0.025 | 0.034 | 0.000 | −0.002 | −0.002 | 0.000 |
| F | −0.092 | −0.022 | −0.014 | 0.000 | 0.000 | 0.000 | 0.000 |
| G | 0.047 | 0.012 | 0.003 | 0.000 | 0.000 | 0.000 | 0.000 |
| H | −0.017 | −0.005 | 0.000 | 0.000 | 0.000 | 0.000 | 0.000 |
| J | 0.004 | 0.001 | 0.000 | 0.000 | 0.000 | 0.000 | 0.000 |
| L | −0.001 | 0.000 | 0.000 | 0.000 | 0.000 | 0.000 | 0.000 |
| M | 0.000 | 0.000 | 0.000 | 0.000 | 0.000 | 0.000 | 0.000 |
| N | 0.000 | 0.000 | 0.000 | 0.000 | 0.000 | 0.000 | 0.000 |
| O | 0.000 | 0.000 | 0.000 | 0.000 | 0.000 | 0.000 | 0.000 |
| P | 0.000 | 0.000 | 0.000 | 0.000 | 0.000 | 0.000 | 0.0 |

Figure 13:
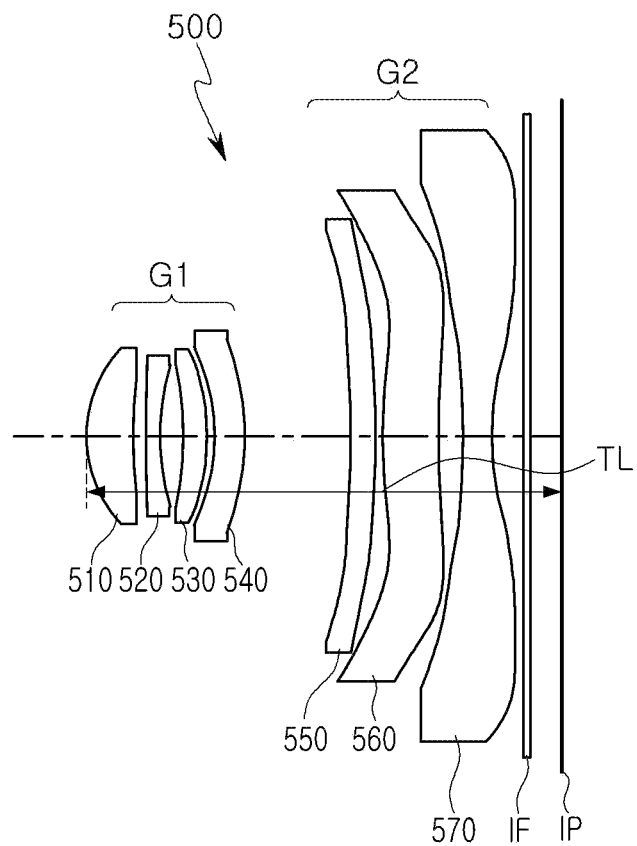
FIG. 13 is a view illustrating a fifth example of an optical imaging system.
Figure 14:
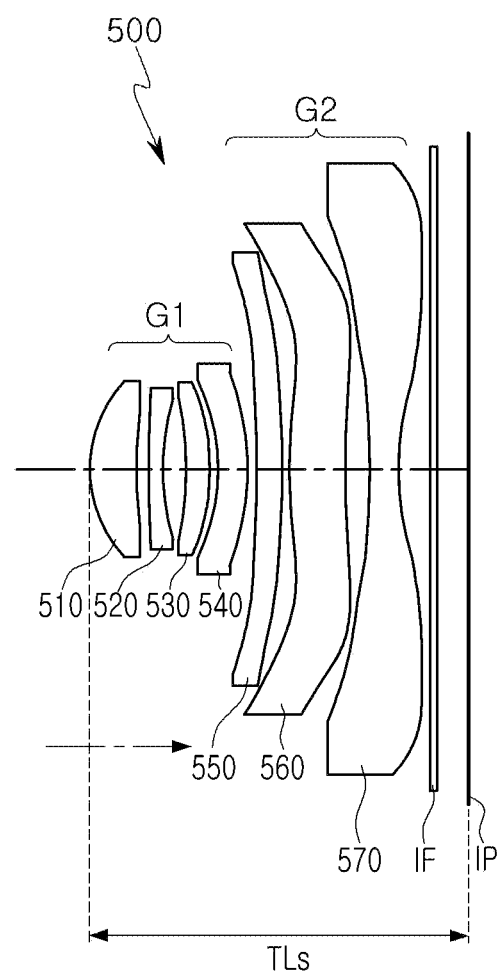
FIG. 14 is a view illustrating a contracted state of the optical imaging system illustrated in FIG. 13.
Figure 15:
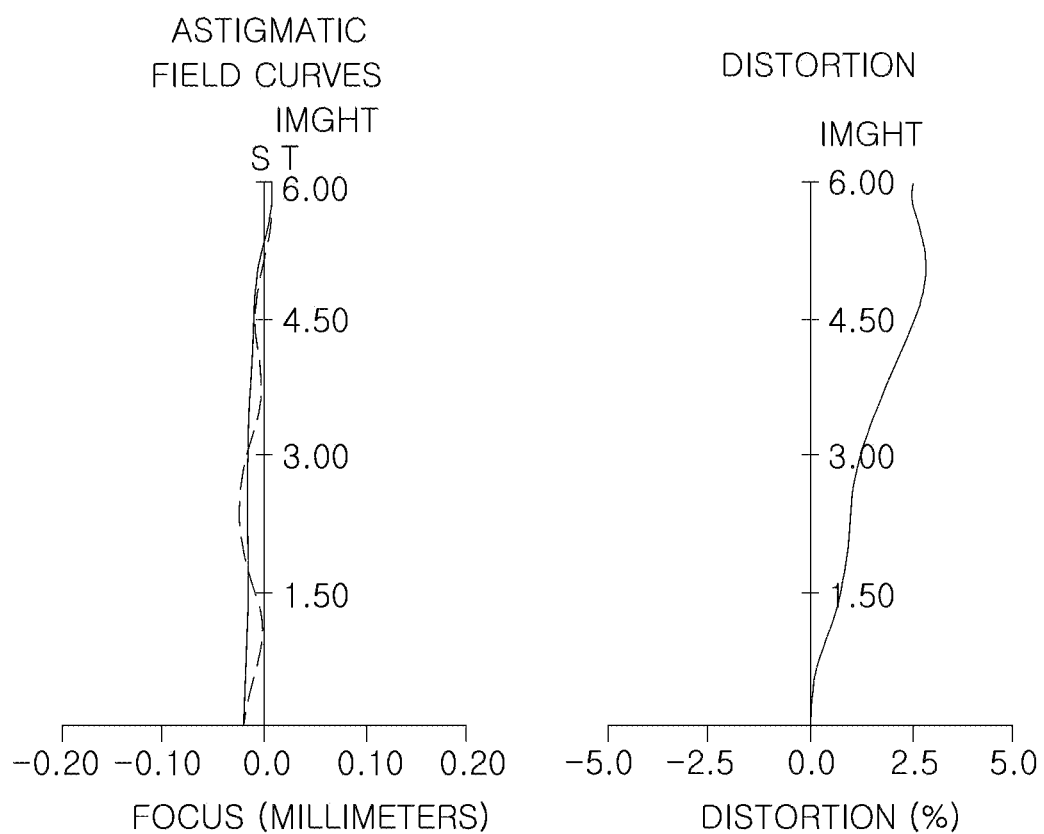
FIG. 15 is a view illustrating aberration curves of the optical imaging system illustrated in FIG. 13.

FIG. 13 is a view illustrating a fifth example of an optical imaging system, FIG. 14 is a view illustrating a contracted state of the optical imaging system illustrated in FIG. 13, and FIG. 15 is a view illustrating aberration curves of the optical imaging system illustrated in FIG. 13.

Referring to FIG. 13, an optical imaging system 500 may include a first lens 510, a second lens 520, a third lens 530, a fourth lens 540, a fifth lens 550, a sixth lens 560, a seventh lens 570, a filter IF, and an imaging plane IP.

The first lens 510 may have a positive refractive power. The first lens 510 may have a convex object-side surface and a concave image-side surface. The second lens 520 may have a negative refractive power. The second lens 520 may have a convex object-side surface and a concave image-side surface. The third lens 530 may have a negative refractive power. The third lens 530 may have a concave object-side surface and a convex image-side surface. The fourth lens 540 may have a negative refractive power. The fourth lens 540 may have a concave object-side surface and a convex image-side surface. The fifth lens 550 may have a positive refractive power. The fifth lens 550 may have a concave object-side surface and a convex image-side surface. Inflection points may be formed on the object-side surface and the image-side surface of the fifth lens 550. The sixth lens 560 may have a positive refractive power. The sixth lens 560 may have a convex object-side surface and a concave image-side surface. Inflection points may be formed on the object-side surface and the image-side surface of the sixth lens 560. The seventh lens 570 may have a positive refractive power. The seventh lens 570 may have a convex object-side surface and a concave image-side surface. Inflection points may be formed on the object-side surface and the image-side surface of the seventh lens 570.

The optical imaging system 500 may include a plurality of lens groups. For example, the first lens 510 to the fourth lens 540 constitute a first lens group G1, and the fifth to seventh lenses 550 to 570 constitute a second lens group G2. An air gap between the first lens group G1 and the second lens group G2 may be a maximum air gap Gmax in the optical imaging system 500. In other words, the air gap between the fourth lens 540 and the fifth lens 550 may be greater than all other air gaps between the lenses in the optical imaging system 500.

As illustrated in FIG. 14, the first lens group G1 may be moved closer to the second lens group G2 to decrease a length of the optical imaging system 500. Such a positional movement of the first lens group G1 may be selectively performed. For example, the first lens group G1 may be disposed to provide a maximum distance to the second lens group G2 in an active mode of the optical imaging system 500 (a mode of being capable of capturing an image), and may be disposed to provide a minimum distance to the second lens group G2 in an inactive mode of the optical imaging system 500 (a mode of being incapable of capturing an image). A length of the optical imaging system 500 (a distance between the object-side surface of the first lens 510 and the imaging plane IP) may vary depending on the position of the first lens group G1. For example, a length TL of the optical imaging system 500 in the active mode may be greater than a length TLs of the optical imaging system 500 in the inactive mode. Thus, the optical imaging system 500 may mitigate an issue in which a camera module protrudes outwardly from a mobile terminal device when the camera module is not being used.

Characteristics of the lenses and the other elements of the optical imaging system 500 are listed in Table 9 below, and aspherical constants of the surfaces of the lenses of the optical imaging system 500 are listed in Table 10 below.

The bold value 2.000 in the Thickness/Distance column in Table 9 is the maximum air gap Gmax, which is the air gap between the first lens group G1 and the second lens group G2, and is also the air gap between the fourth lens 540 and the fifth lens 550.

TABLE 9

| Surface No. | Element | Radius of Curvature | Thickness/Distance | Refractive Index | Abbe Number |
|---|---|---|---|---|---|
| S1 | | Infinity | 0.000 | | |
| S2 | First | 2.59 | 0.895 | 1.544 | 56.1 |
| S3 | Lens | 14.96 | 0.237 | | |
| S4 | Second | 100.02 | 0.250 | 1.614 | 25.9 |
| S5 | Lens | 5.69 | 0.433 | | |
| S6 | Third | −44.13 | 0.447 | 1.567 | 38.0 |
| S7 | Lens | −8.79 | 0.163 | | |
| S8 | Fourth | −5.64 | 0.553 | 1.651 | 21.5 |
| S9 | Lens | −6.24 | 2.000 | | |
| S10 | Fifth | −67.79 | 0.500 | 1.535 | 56.1 |
| S11 | Lens | −15.36 | 0.100 | | |
| S12 | Sixth | 9.22 | 1.113 | 1.535 | 56.1 |
| S13 | Lens | 62.61 | 0.405 | | |
| S14 | Seventh | 16.42 | 0.514 | 1.535 | 56.1 |
| S15 | Lens | 2.73 | 0.610 | | |
| S16 | Filter | Infinity | 0.110 | 1.518 | 64.2 |
| S17 | | Infinity | 0.600 | | |
| S18 | Imaging Plane | Infinity | | | |

TABLE 10

| Surface No. | S2 | S3 | S4 | S5 | S6 | S7 | S8 |
|---|---|---|---|---|---|---|---|
| k | −0.008 | 52.513 | −20.868 | 3.116 | −14.639 | 24.821 | 7.207 |
| A | −0.001 | −0.022 | −0.060 | −0.048 | −0.033 | −0.040 | −0.041 |
| B | 0.025 | 0.043 | 0.090 | −0.003 | −0.004 | 0.010 | 0.017 |
| C | −0.120 | −0.199 | −0.212 | 0.525 | 0.188 | 0.069 | −0.010 |
| D | 0.367 | 0.749 | 0.851 | −2.536 | −1.112 | −0.326 | 0.015 |
| E | −0.746 | −1.865 | −2.520 | 7.325 | 3.908 | 0.874 | −0.007 |
| F | 1.051 | 3.158 | 4.995 | −14.254 | −9.105 | −1.566 | −0.028 |
| G | −1.054 | −3.747 | −6.826 | 19.438 | 14.627 | 1.951 | 0.072 |
| H | 0.764 | 3.169 | 6.579 | −18.921 | −16.530 | −1.723 | −0.085 |
| J | −0.401 | −1.921 | −4.512 | 13.212 | 13.231 | 1.085 | 0.062 |
| L | 0.152 | 0.828 | 2.190 | −6.562 | −7.451 | −0.484 | −0.029 |
| M | −0.040 | −0.247 | −0.735 | 2.262 | 2.884 | 0.149 | 0.009 |
| N | 0.007 | 0.049 | 0.162 | −0.514 | −0.730 | −0.030 | −0.002 |
| O | −0.001 | −0.006 | −0.021 | 0.069 | 0.109 | 0.004 | 0.000 |
| P | 0.000 | 0.000 | 0.001 | −0.004 | −0.007 | 0.000 | 0.000 |

| Surface No. | S9 | S10 | S11 | S12 | S13 | S14 | S15 |
|---|---|---|---|---|---|---|---|
| k | −68.364 | −7.843 | −17.759 | −4.780 | 173.652 | −12.609 | −0.827 |
| A | −0.053 | 0.005 | −0.006 | −0.023 | −0.008 | −0.035 | −0.043 |
| B | 0.028 | −0.009 | 0.009 | 0.024 | 0.013 | 0.011 | 0.007 |
| C | −0.008 | 0.007 | −0.005 | −0.014 | −0.008 | −0.005 | −0.001 |
| D | −0.019 | −0.003 | 0.002 | 0.005 | 0.002 | 0.001 | 0.000 |
| E | 0.044 | 0.001 | 0.000 | −0.001 | 0.000 | 0.000 | 0.000 |
| F | −0.052 | 0.000 | 0.000 | 0.000 | 0.000 | 0.000 | 0.000 |
| G | 0.040 | 0.000 | 0.000 | 0.000 | 0.000 | 0.000 | 0.000 |
| H | −0.021 | 0.000 | 0.000 | 0.000 | 0.000 | 0.000 | 0.000 |
| J | 0.008 | 0.000 | 0.000 | 0.000 | 0.000 | 0.000 | 0.000 |
| L | −0.002 | 0.000 | 0.000 | 0.000 | 0.000 | 0.000 | 0.000 |
| M | 0.000 | 0.000 | 0.000 | 0.000 | 0.000 | 0.000 | 0.000 |
| N | 0.000 | 0.000 | 0.000 | 0.000 | 0.000 | 0.000 | 0.000 |
| O | 0.000 | 0.000 | 0.000 | 0.000 | 0.000 | 0.000 | 0.000 |
| P | 0.000 | 0.000 | 0.000 | 0.000 | 0.000 | 0.000 | 0.0 |

Figure 16:
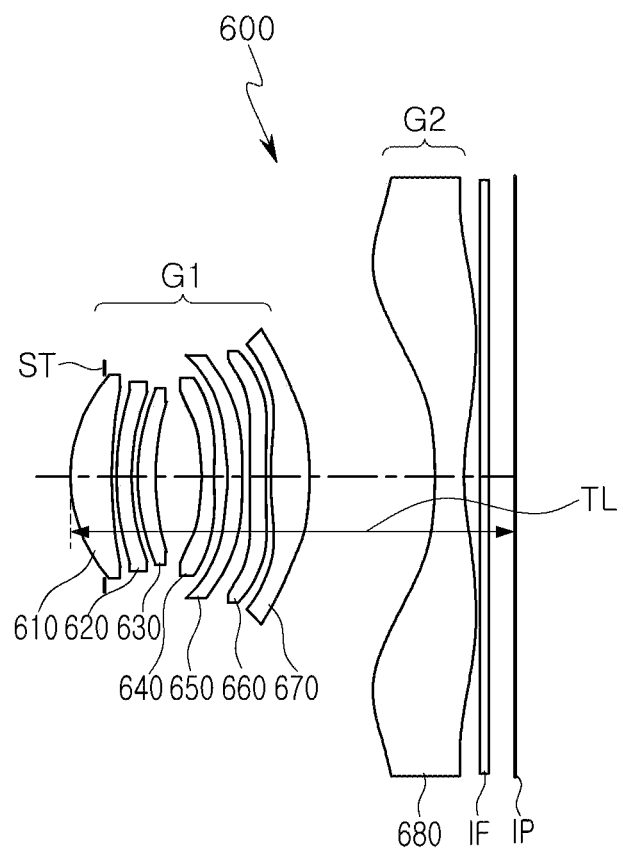
FIG. 16 is a view illustrating a sixth example of an optical imaging system.
Figure 17:
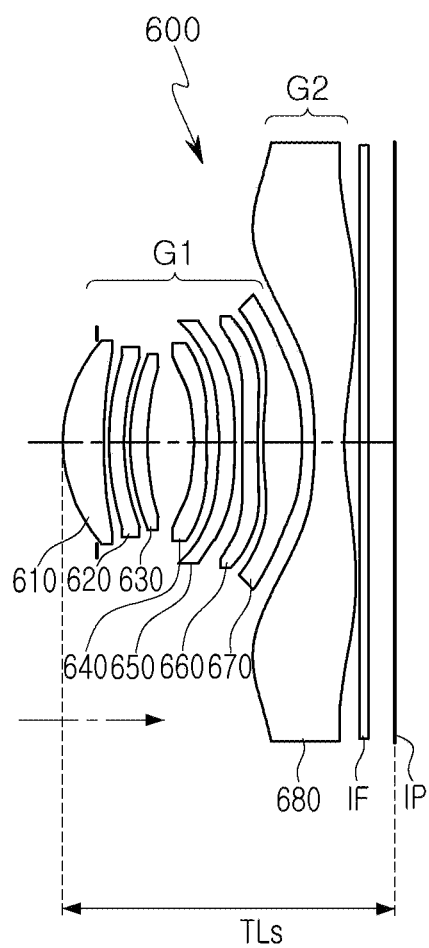
FIG. 17 is a view illustrating a contracted state of the optical imaging system illustrated in FIG. 16.
Figure 18:
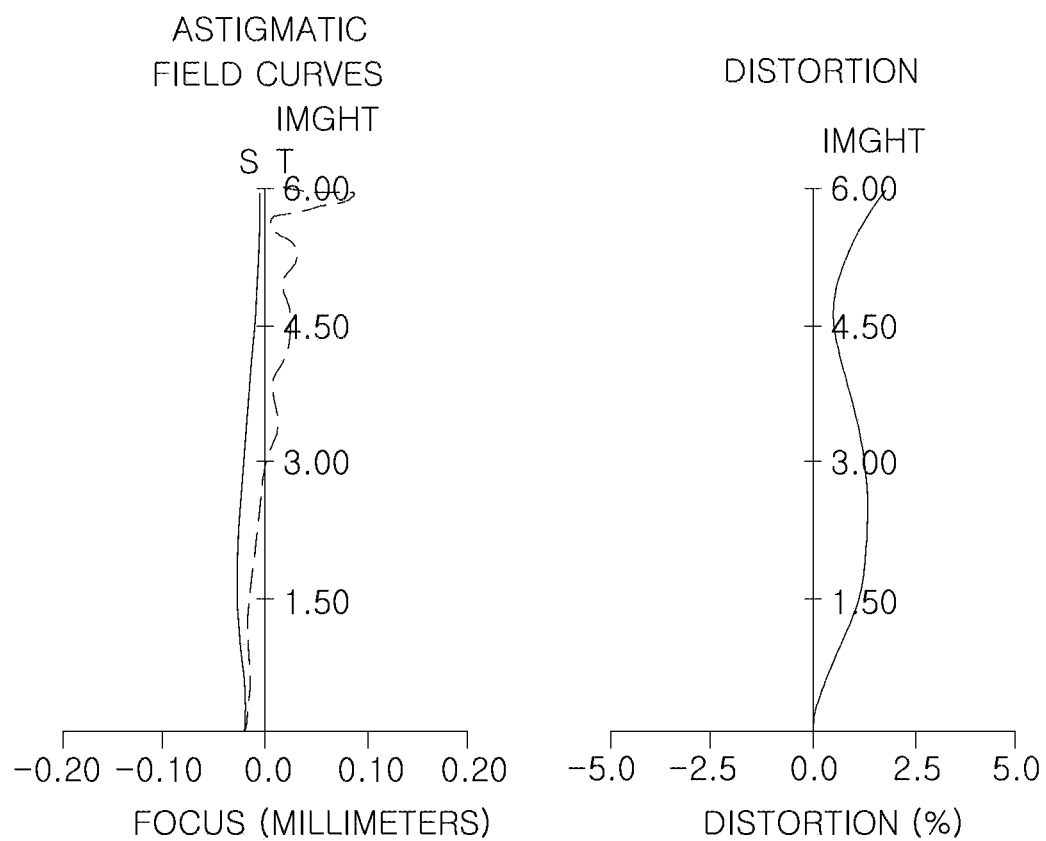
FIG. 18 is a view illustrating aberration curves of the optical imaging system illustrated in FIG. 16.

FIG. 16 is a view illustrating a sixth example of an optical imaging system, FIG. 17 is a view illustrating a contracted state of the optical imaging system illustrated in FIG. 16, and FIG. 18 is a view illustrating aberration curves of the optical imaging system illustrated in FIG. 16.

Referring to FIG. 16, an optical imaging system 600 may include a first lens 610, a second lens 620, a third lens 630, a fourth lens 640, a fifth lens 650, a sixth lens 660, a seventh lens 670, an eighth lens 680, a filter IF, and an imaging plane IP.

The first lens 610 may have a positive refractive power. The first lens 610 may have a convex object-side surface and a concave image-side surface. The second lens 620 may have a negative refractive power. The second lens 620 may have a convex object-side surface and a concave image-side surface. The third lens 630 may have a positive refractive power. The third lens 630 may have a convex object-side surface and a concave image-side surface. The fourth lens 640 may have a negative refractive power. The fourth lens 640 may have a concave object-side surface and a concave image-side surface. The fifth lens 650 may have a negative refractive power. The fifth lens 650 may have a concave object-side surface and a concave image-side surface. Inflection points may be formed on the object-side surface and the image-side surface of the fifth lens 650. The sixth lens 660 may have a negative refractive power. The sixth lens 660 may have a convex object-side surface and a concave image-side surface. Inflection points may be formed on the object-side surface and the image-side surface of the sixth lens 660. The seventh lens 670 may have a positive refractive power. The seventh lens 670 may have a convex object-side surface and a convex image-side surface. Inflection points may be formed on the object-side surface and the image-side surface of the seventh lens 670. The eighth lens 680 may have a negative refractive power. The eighth lens 680 may have a concave object-side surface and a concave image-side surface. Inflection points may be formed on the object-side surface and the image-side surface of the eighth lens 680.

The optical imaging system 600 may include a plurality of lens groups. For example, the first lens 610 to the seventh lens 670 may constitute a first lens group G1, and the eighth lens 680 may constitute a second lens group G2. An air gap between the first lens group G1 and the second lens group G2 may be a maximum air gap Gmax in the optical imaging system 600. In other words, the air gap between the seventh lens 670 and the eighth lens 680 may be greater than all other air gaps between the lenses in the optical imaging system 600.

As illustrated in FIG. 17, the first lens group G1 may be moved closer to a side of the second lens group G2 to decrease a length of the optical imaging system 600. Such a positional movement of the first lens group G1 may be selectively performed. For example, the first lens group G1 may be disposed to provide a maximum distance to the second lens group G2 in an active mode of the optical imaging system 600 (a mode of being capable of capturing an image), and may be disposed to provide a minimum distance to the second lens group G2 in an inactive mode of the optical imaging system 600 (a mode of being incapable of capturing an image). A length of the optical imaging system 600 (a distance between the object-side surface of the first lens 610 and the imaging plane IP) may vary depending on the position of the first lens group G1. For example, a length TL of the optical imaging system 600 in the active mode may be greater than a length TLs of the optical imaging system 600 in the inactive mode. Thus, the optical imaging system 600 may mitigate an issue in which a camera module protrudes outwardly from a mobile terminal device when the camera module is not being used.

Characteristics of the lenses and the other elements of the optical imaging system 600 are listed in Table 11 below, and aspherical constants of the surfaces of the lenses of the optical imaging system 600 are listed in Table 12 below.

The bold value 2.512 in the Thickness/Distance column in Table 11 is the maximum air gap Gmax, which is the air gap between the first lens group G1 and the second lens group G2, and is also the air gap between the seventh lens 670 and the eighth lens 680.

TABLE 11

| Surface No. | Element | Radius of Curvature | Thickness/ Distance | Refractive Index | Abbe Number |
|---|---|---|---|---|---|
| S1 |  | Infinity | 0.000 |  |  |
| S2 | First | 3.15 | 0.816 | 1.544 | 56.1 |
| S3 | Lens | 8.97 | 0.113 |  |  |
| S4 | Second | 4.92 | 0.260 | 1.671 | 19.4 |
| S5 | Lens | 3.43 | 0.142 |  |  |
| S6 | Third | 4.39 | 0.345 | 1.535 | 56.1 |
| S7 | Lens | 6.33 | 0.910 |  |  |
| S8 | Fourth | −23.83 | 0.274 | 1.671 | 19.4 |
| S9 | Lens | 159.12 | 0.230 |  |  |
| S10 | Fifth | −28.25 | 0.359 | 1.544 | 56.1 |
| S11 | Lens | 11.62 | 0.100 |  |  |
| S12 | Sixth | 10.48 | 0.300 | 1.567 | 38.0 |
| S13 | Lens | 9.21 | 0.135 |  |  |
| S14 | Seventh | 7.72 | 0.809 | 1.544 | 56.1 |
| S15 | Lens | −3.78 | 2.512 |  |  |
| S16 | Eighth | −7.73 | 0.541 | 1.544 | 56.1 |
| S17 | Lens | 5.7106311 | 0.250 |  |  |
| S18 | Filter | Infinity | 0.210 | 1.518 | 64.2 |
| S19 |  | Infinity | 0.510 |  |  |
| S20 | Imaging Plane | Infinity |  |  |  |

TABLE 12

| Surface No. | S2 | S3 | S4 | S5 | S6 | S7 | S8 | S9 |
|---|---|---|---|---|---|---|---|---|
| k | −0.036 | 0.454 | −0.020 | 0.015 | 0.003 | 0.006 | 0.000 | 0.000 |
| A | −0.001 | −0.006 | −0.012 | −0.006 | −0.012 | −0.009 | −0.012 | −0.004 |
| B | 0.011 | 0.006 | 0.014 | −0.058 | 0.011 | 0.032 | −0.054 | −0.065 |
| C | −0.040 | −0.017 | −0.065 | 0.285 | −0.025 | −0.152 | 0.093 | 0.108 |
| D | 0.093 | 0.018 | 0.140 | −0.897 | 0.017 | 0.494 | −0.098 | −0.126 |
| E | −0.144 | −0.006 | −0.196 | 1.824 | 0.039 | −1.111 | 0.018 | 0.113 |
| F | 0.154 | −0.008 | 0.195 | −2.523 | −0.118 | 1.767 | 0.114 | −0.089 |
| G | −0.118 | 0.011 | −0.140 | 2.459 | 0.153 | −2.016 | −0.203 | 0.063 |
| H | 0.065 | −0.007 | 0.073 | −1.719 | −0.121 | 1.662 | 0.194 | −0.037 |
| J | −0.026 | 0.003 | −0.027 | 0.866 | 0.062 | −0.990 | −0.122 | 0.016 |
| L | 0.007 | −0.001 | 0.007 | −0.312 | −0.021 | 0.421 | 0.053 | −0.005 |
| M | −0.001 | 0.000 | −0.001 | 0.078 | 0.004 | −0.125 | −0.016 | 0.001 |
| N | 0.000 | 0.000 | 0.000 | −0.013 | 0.000 | 0.024 | 0.003 | 0.000 |

TABLE 12-continued

| | | | | | | | | |
|---|---|---|---|---|---|---|---|---|
| O | 0.000 | 0.000 | 0.000 | 0.001 | 0.000 | −0.003 | 0.000 | 0.000 |
| P | 0.000 | 0.000 | 0.000 | 0.000 | 0.000 | 0.000 | 0.000 | 0.000 |

| Surface No. | S10 | S11 | S12 | S13 | S14 | S15 | S16 | S17 |
|---|---|---|---|---|---|---|---|---|
| k | −1.800 | 0.320 | −1.294 | −0.201 | 0.479 | 0.033 | −0.408 | −0.028 |
| A | −0.037 | −0.048 | 0.004 | 0.003 | 0.002 | 0.015 | −0.006 | −0.003 |
| B | −0.031 | −0.068 | −0.089 | −0.072 | −0.048 | −0.009 | −0.006 | −0.007 |
| C | 0.056 | 0.106 | 0.120 | 0.092 | 0.057 | 0.010 | 0.003 | 0.003 |
| D | −0.020 | −0.071 | −0.093 | −0.077 | −0.051 | −0.012 | −0.001 | −0.001 |
| E | −0.027 | 0.013 | 0.045 | 0.047 | 0.035 | 0.009 | 0.000 | 0.000 |
| F | 0.044 | 0.017 | −0.014 | −0.023 | −0.019 | −0.005 | 0.000 | 0.000 |
| G | −0.031 | −0.018 | 0.003 | 0.009 | 0.008 | 0.002 | 0.000 | 0.000 |
| H | 0.014 | 0.009 | 0.000 | −0.003 | −0.002 | 0.000 | 0.000 | 0.000 |
| J | −0.004 | −0.003 | 0.000 | 0.001 | 0.000 | 0.000 | 0.000 | 0.000 |
| L | 0.001 | 0.001 | 0.000 | 0.000 | 0.000 | 0.000 | 0.000 | 0.000 |
| M | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.0 |

Figure 19:
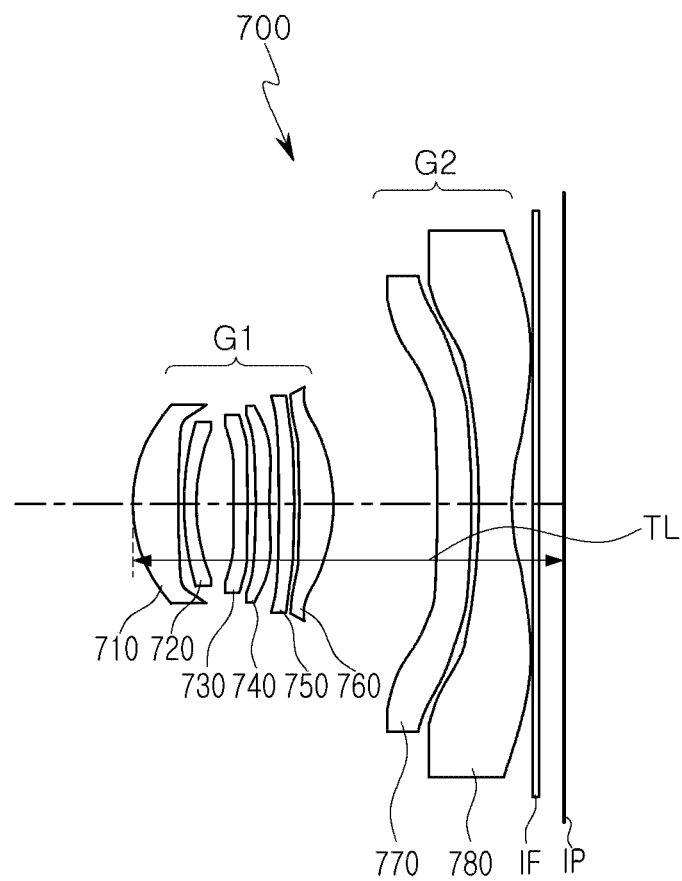
FIG. 19 is a view illustrating a seventh example of an optical imaging system.
Figure 20:
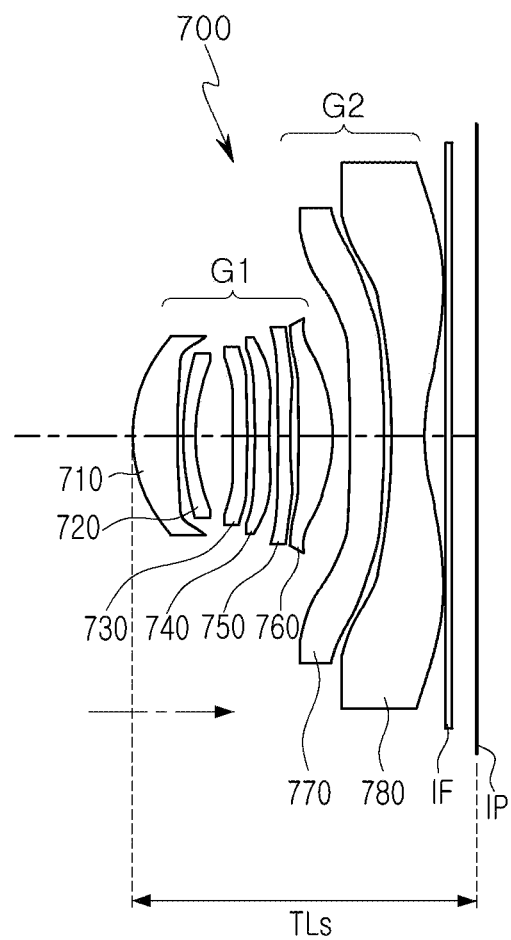
FIG. 20 is a view illustrating a contracted state of the optical imaging system illustrated in FIG. 19.
Figure 21:
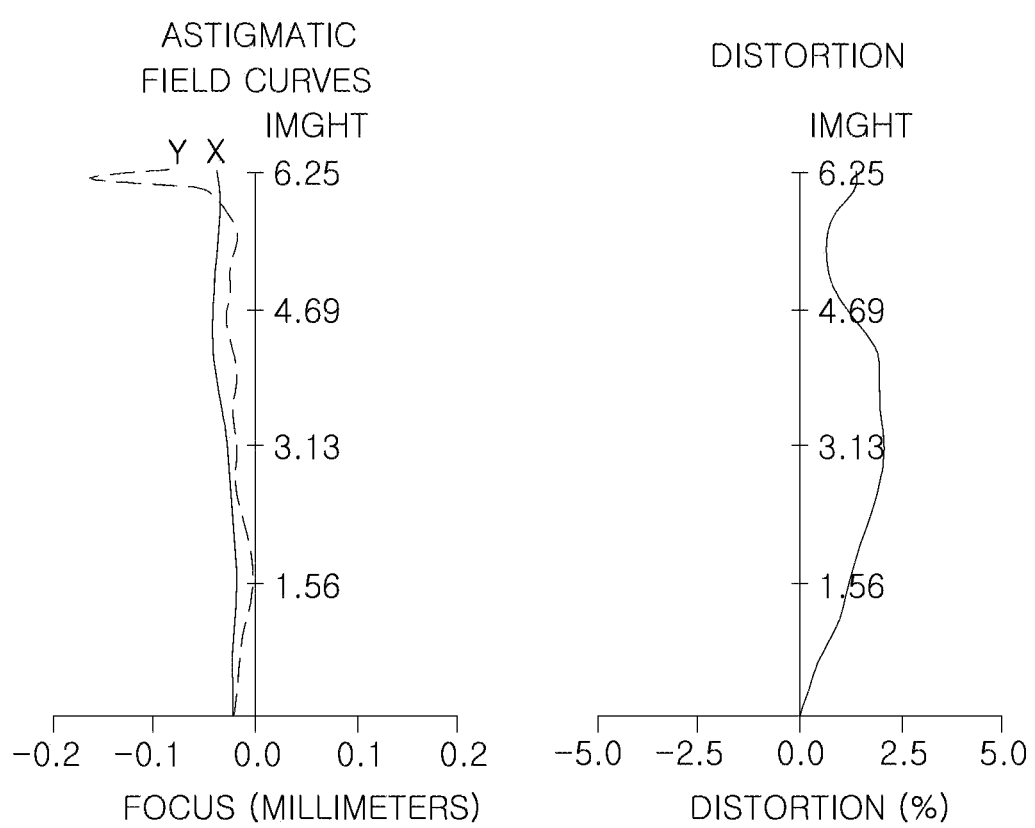
FIG. 21 is a view illustrating aberration curves of the optical imaging system illustrated in FIG. 19.

FIG. 19 is a view illustrating a seventh example of an optical imaging system, FIG. 20 is a view illustrating a contracted state of the optical imaging system illustrated in FIG. 19, and FIG. 21 is a view illustrating aberration curves of the optical imaging system illustrated in FIG. 19.

Referring to FIG. 19, an optical imaging system 700 may include a first lens 710, a second lens 720, a third lens 730, a fourth lens 740, a fifth lens 750, a sixth lens 760, a seventh lens 770, an eighth lens 780, a filter IF, and an imaging plane IP.

The first lens 710 may have a positive refractive power. The first lens 710 may have a convex object-side surface and a concave image-side surface. The second lens 720 may have a negative refractive power. The second lens 720 may have a convex object-side surface and a concave image-side surface. The third lens 730 may have a negative refractive power. The third lens 730 may have a convex object-side surface and a concave image-side surface. The fourth lens 740 may have a negative refractive power. The fourth lens 740 may have a concave object-side surface and a concave image-side surface. The fifth lens 750 may have a positive refractive power. The fifth lens 750 may have a convex object-side surface and a concave image-side surface. Inflection points may be formed on the object-side surface and the image-side surface of the fifth lens 750. The sixth lens 760 may have a positive refractive power. The sixth lens 760 may have a convex object-side surface and a convex image-side surface. Inflection points may be formed on the object-side surface and the image-side surface of the sixth lens 760. The seventh lens 770 may have a positive refractive power. The seventh lens 770 may have a concave object-side surface and a convex image-side surface. Inflection points may be formed on the object-side surface and the image-side surface of the seventh lens 770. The eighth lens 780 may have a negative refractive power. The eighth lens 780 may have a convex object-side surface and a concave image-side surface. Inflection points may be formed on the object-side surface and the image-side surface of the eighth lens 780.

The optical imaging system 700 may include a plurality of lens groups. For example, the first lens 710 to the sixth lens 760 may constitute a first lens group G1, and the seventh lens 770 and the eighth lens 780 may constitute a second lens group G2. An air gap between the first lens group G1 and the second lens group G2 may be a maximum air gap Gmax in the optical imaging system 700. In other words, the air gap between the sixth lens 760 and the seventh lens 770 may be greater than all other air gaps between the lenses in the optical imaging system 700.

As illustrated in FIG. 20, the first lens group G1 may be moved closer to the second lens group G2 to decrease a length of the optical imaging system 700. Such a positional movement of the first lens group G1 may be selectively performed. For example, the first lens group G1 may be disposed to provide a maximum distance to the second lens group G2 in an active mode of the optical imaging system 700 (a mode of being capable of capturing an image), and may be disposed to provide a minimum distance to the second lens group G2 in an inactive mode of the optical imaging system 700 (a mode of being incapable of capturing an image). A length of the optical imaging system 700 (a distance between the object-side surface of the first lens 710 and the imaging plane IP) may vary depending on the position of the first lens group G1. For example, a length TL of the optical imaging system 700 in the active mode may be greater than a length TLs of the optical imaging system 700 in the inactive mode. Thus, the optical imaging system 700 may mitigate an issue in which a camera module protrudes outwardly from a mobile terminal device when the camera module is not being used.

Characteristics of the lenses and the other elements of the optical imaging system 700 are listed in Table 13 below, and aspherical constants of the surfaces of the lenses of the optical imaging system 700 are listed in Table 14 below.

The bold value 2.082 in the Thickness/Distance column in Table 13 is the maximum air gap Gmax, which is the air gap between the first lens group G1 and the second lens group G2, and is also the air gap between the sixth lens 760 and the seventh lens 770.

TABLE 13

| Surface No. | Element | Radius of Curvature | Thickness/ Distance | Refractive Index | Abbe Number |
|---|---|---|---|---|---|
| S1 | | Infinity | 0.000 | | |
| S2 | First | 3.15 | 0.898 | 1.544 | 56.1 |
| S3 | Lens | 13.23 | 0.139 | | |
| S4 | Second | 6.22 | 0.250 | 1.671 | 19.4 |
| S5 | Lens | 4.34 | 0.715 | | |
| S6 | Third | 14.06 | 0.271 | 1.535 | 56.1 |
| S7 | Lens | 10.65 | 0.215 | | |
| S8 | Fourth | −19.26 | 0.319 | 1.671 | 19.4 |
| S9 | Lens | 16.28 | 0.103 | | |

TABLE 13-continued

| Surface No. | Element | Radius of Curvature | Thickness/ Distance | Refractive Index | Abbe Number |
|---|---|---|---|---|---|
| S10 | Fifth | 14.21 | 0.298 | 1.544 | 56.1 |
| S11 | Lens | 15.39 | 0.102 | | |
| S12 | Sixth | 16.20 | 0.706 | 1.567 | 38.0 |
| S13 | Lens | −3.68 | 2.082 | | |
| S14 | Seventh | −156.99 | 0.702 | 1.544 | 56.1 |
| S15 | Lens | −26.91 | 0.114 | | |
| S16 | Eighth | 7.57 | 0.614 | 1.544 | 56.1 |
| S17 | Lens | 2.1370821 | 0.415 | | |
| S18 | Filter | Infinity | 0.110 | 1.518 | 64.2 |
| S19 | | Infinity | 0.530 | | |
| S20 | Imaging Plane | Infinity | | | |

TABLE 14

| Surface No. | S2 | S3 | S4 | S5 | S6 | S7 | S8 | S9 |
|---|---|---|---|---|---|---|---|---|
| k | −0.089 | 0.273 | −0.632 | 3.762 | −116.87 | 15.295 | −13.653 | −23.603 |
| A | 0.000 | −0.010 | −0.022 | −0.012 | −0.015 | −0.014 | −0.045 | −0.071 |
| B | 0.008 | 0.010 | 0.008 | −0.100 | 0.005 | 0.001 | 0.075 | 0.067 |
| C | −0.026 | −0.026 | 0.002 | 0.625 | −0.096 | −0.022 | −0.137 | −0.076 |
| D | 0.053 | 0.089 | 0.052 | −2.253 | 0.324 | 0.032 | 0.188 | 0.049 |
| E | −0.071 | −0.192 | −0.248 | 5.366 | −0.699 | −0.021 | −0.183 | −0.013 |
| F | 0.066 | 0.270 | 0.554 | −8.839 | 1.034 | −0.006 | 0.128 | −0.007 |
| G | −0.044 | −0.260 | −0.762 | 10.340 | −1.080 | 0.027 | −0.064 | 0.009 |
| H | 0.021 | 0.177 | 0.699 | −8.707 | 0.811 | −0.027 | 0.023 | −0.005 |
| J | −0.007 | −0.086 | −0.442 | 5.290 | −0.439 | 0.016 | −0.006 | 0.001 |
| L | 0.002 | 0.029 | 0.194 | −2.297 | 0.169 | −0.006 | 0.001 | 0.000 |
| M | 0.000 | −0.007 | −0.058 | 0.695 | −0.045 | 0.002 | 0.000 | 0.000 |
| N | 0.000 | 0.001 | 0.011 | −0.139 | 0.008 | 0.000 | 0.000 | 0.000 |
| O | 0.000 | 0.000 | −0.001 | 0.017 | −0.001 | 0.000 | 0.000 | 0.000 |
| P | 0.000 | 0.000 | 0.000 | −0.001 | 0.000 | 0.000 | 0.000 | 0.000 |

| Surface No. | S10 | S11 | S12 | S13 | S14 | S15 | S16 | S17 |
|---|---|---|---|---|---|---|---|---|
| k | 2.143 | −3.276 | 0.000 | 0.000 | −12710 | −60.910 | −1.571 | −0.880 |
| A | −0.028 | 0.003 | 0.007 | 0.005 | −0.003 | −0.046 | −0.129 | −0.091 |
| B | −0.008 | −0.107 | −0.093 | −0.003 | 0.005 | 0.042 | 0.059 | 0.028 |
| C | 0.050 | 0.183 | 0.144 | −0.005 | −0.003 | −0.017 | −0.016 | −0.007 |
| D | −0.085 | −0.195 | −0.149 | 0.013 | 0.001 | 0.004 | 0.003 | 0.001 |
| E | 0.080 | 0.141 | 0.108 | −0.015 | 0.000 | −0.001 | 0.000 | 0.000 |
| F | −0.050 | −0.073 | −0.056 | 0.011 | 0.000 | 0.000 | 0.000 | 0.000 |
| G | 0.022 | 0.027 | 0.022 | −0.005 | 0.000 | 0.000 | 0.000 | 0.000 |
| H | −0.007 | −0.007 | −0.006 | 0.002 | 0.000 | 0.000 | 0.000 | 0.000 |
| J | 0.002 | 0.001 | 0.001 | 0.000 | 0.000 | 0.000 | 0.000 | 0.000 |
| L | 0.000 | 0.000 | 0.000 | 0.000 | 0.000 | 0.000 | 0.000 | 0.000 |
| M | 0.000 | 0.000 | 0.000 | 0.000 | 0.000 | 0.000 | 0.000 | 0.000 |
| N | 0.000 | 0.000 | 0.000 | 0.000 | 0.000 | 0.000 | 0.000 | 0.000 |
| O | 0.000 | 0.000 | 0.000 | 0.000 | 0.000 | 0.000 | 0.000 | 0.000 |
| P | 0.000 | 0.000 | 0.000 | 0.000 | 0.000 | 0.000 | 0.000 | 0.0 |

Figure 22:
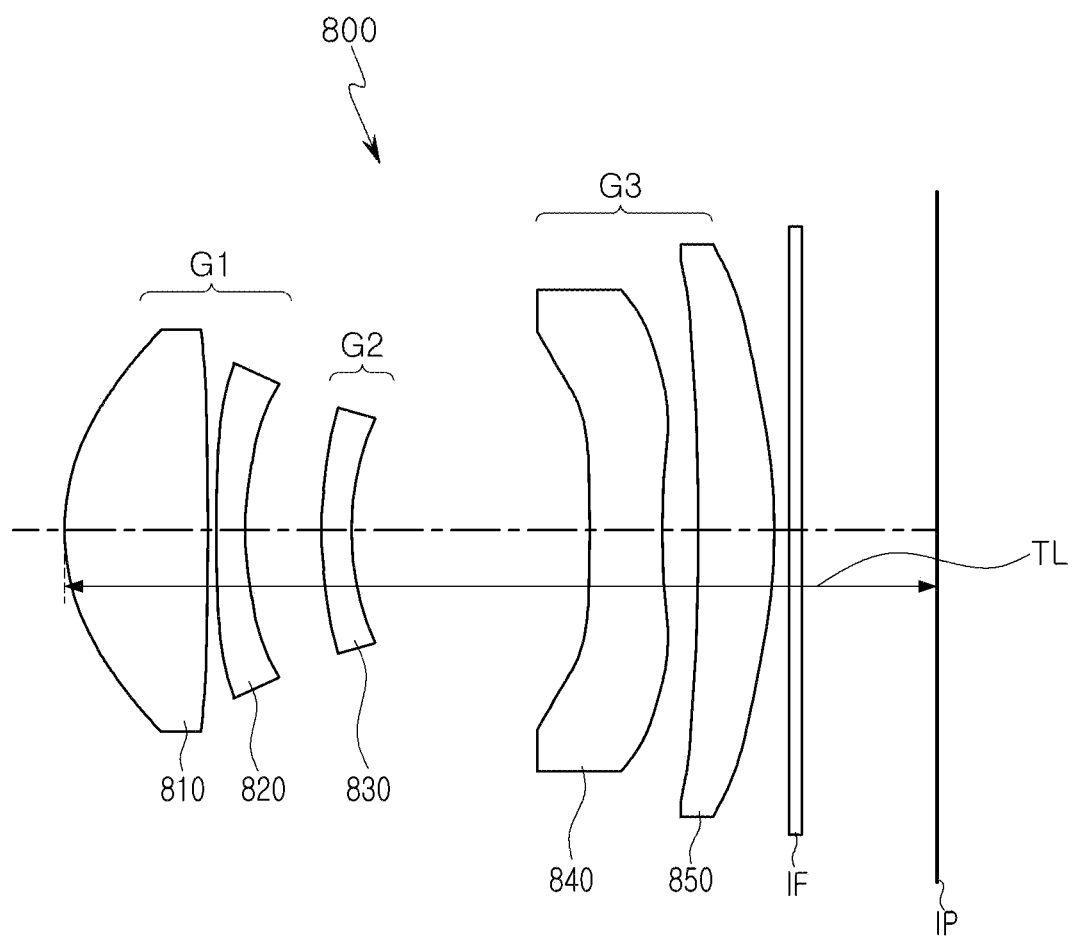
FIG. 22 is a view illustrating an eighth example of an optical imaging system.
Figure 23:
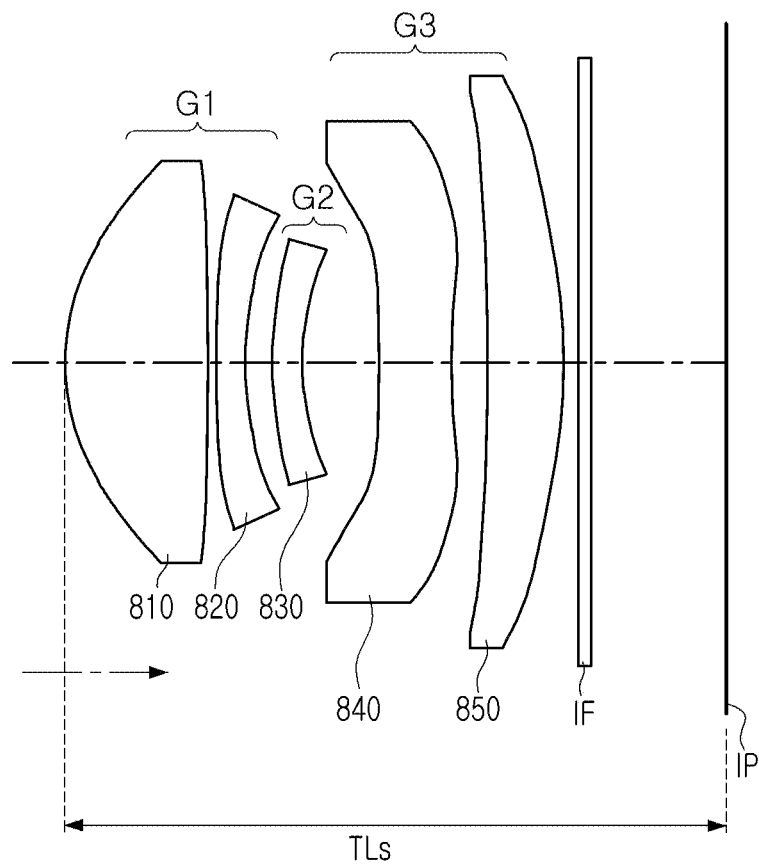
FIG. 23 is a view illustrating a contracted state of the optical imaging system illustrated in FIG. 22.
Figure 24:
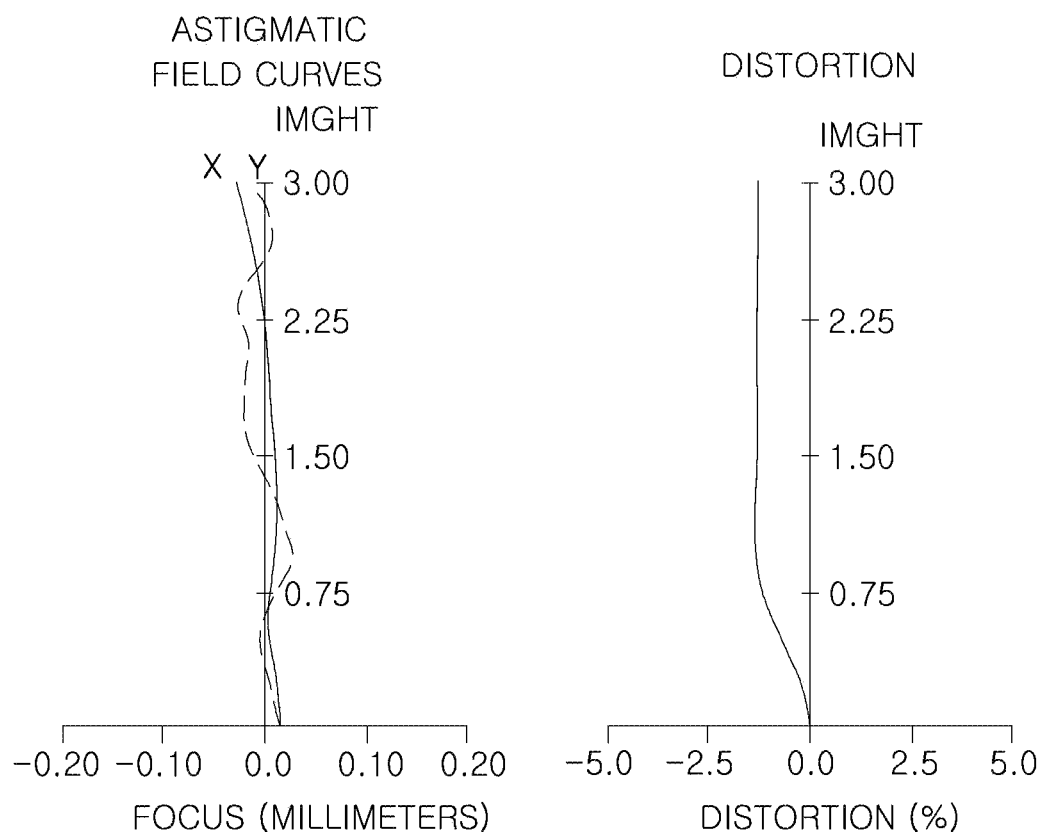
FIG. 24 is a view illustrating aberration curves of the optical imaging system illustrated in FIG. 22.

FIG. 22 is a view illustrating an eighth example of an optical imaging system, FIG. 23 is a view illustrating a contracted state of the optical imaging system illustrated in FIG. 22, and FIG. 24 is a view illustrating aberration curves of the optical imaging system illustrated in FIG. 22.

Referring to FIG. 22, an optical imaging system 800 may include a first lens 810, a second lens 820, a third lens 830, a fourth lens 840, a fifth lens 850, a filter IF, and an imaging plane IP.

The first lens 810 may have a positive refractive power. The first lens 810 may have a convex object-side surface and a convex image-side surface. The second lens 820 may have a negative refractive power. The second lens 820 may have a convex object-side surface and a concave image-side surface. The third lens 830 may have a negative refractive power. The third lens 830 may have a convex object-side surface and a concave image-side surface. The fourth lens 840 may have a negative refractive power. The fourth lens 840 may have a convex object-side surface and a concave image-side surface. Inflection points may be formed on the object-side surface and the image-side surface of the fourth lens 840. The fifth lens 850 may have a positive refractive power. The fifth lens 850 may have a convex object-side surface and a convex image-side surface.

The optical imaging system 800 may include a plurality of lens groups. For example, the first lens 810 and the second lens 820 may constitute a first lens group G1, the third lens 830 may constitute a second lens group G2, and the fourth lens 840 and the fifth lens 850 may constitute a third lens group G3. An air gap between the second lens group G2 and the third lens group G3 may be a maximum air gap Gmax in the optical imaging system 800. In other words, the air gap between the third lens 830 and the fourth lens 840 may be greater than all other air gaps between the lenses in the optical imaging system 800.

As illustrated in FIG. 23, the first lens group G1 may be moved closer to the second lens group G2 and the second lens group G2 may be moved closer to the third lens group G3 to decrease a length of the optical imaging system 800. Such a positional movement of the first lens group G1 and the second lens group G2 may be selectively performed. For example, the first lens group G1 may be disposed to provide a maximum distance to the second lens group G2 and the second lens group G2 may be disposed to provide a maximum distance to the third lens group G3 in an active mode of the optical imaging system 800 (a mode of being capable of capturing an image), and the first lens group G1 may be disposed to provide a minimum distance to the second lens group G2 and the second lens group G2 may be disposed to provide a minimum distance to the third lens group G3 in an inactive mode of the optical imaging system 800 (a mode of being incapable of capturing an image). A length of the optical imaging system 800 (a distance between the object-side surface of the first lens 810 and the imaging plane IP) may vary depending on the positions of the first lens group G1 and the second lens group G2. For example, a length TL of the optical imaging system 800 in the active mode may be greater than a length TLs of the optical imaging system 800 in the inactive mode. Thus, the optical imaging system 800 may mitigate an issue in which a camera module protrudes outwardly from a mobile terminal device when the camera module is not being used.

Characteristics of the lenses and the other elements of the optical imaging system 800 are listed in Table 15 below, and aspherical constants of the surfaces of the lenses of the optical imaging system 800 are listed in Table 16 below.

The bold value 0.677 in the Thickness/Distance column in Table 15 is the air gap between the first lens group G1 and the second lens group G2, and is also the air gap between the second lens 820 and the third lens 830. The bold value 2.103 in the Thickness/Distance column in Table 15 is the maximum air gap Gmax, which is the air gap between the second lens group G2 and the third lens group G3, and is also the air gap between the third lens 830 and the fourth lens 840.

TABLE 15

| Surface No. | Element | Radius of Curvature | Thickness/ Distance | Refractive Index | Abbe Number |
|---|---|---|---|---|---|
| S1 |  | Infinity | 0.000 |  |  |
| S2 | First | 2.19 | 1.263 | 1.544 | 56.1 |
| S3 | Lens | −22.63 | 0.100 |  |  |
| S4 | Second | 75.97 | 0.250 | 1.661 | 20.4 |
| S5 | Lens | 5.04 | 0.677 |  |  |
| S6 | Third | 5.04 | 0.250 | 1.567 | 37.4 |
| S7 | Lens | 2.76 | 2.103 |  |  |
| S8 | Fourth | 13.91 | 0.619 | 1.544 | 56.1 |
| S9 | Lens | 2.67 | 0.360 |  |  |
| S10 | Fifth | 12.36 | 0.686 | 1.661 | 20.4 |
| S11 | Lens | −14.97 | 0.100 |  |  |
| S12 | Filter | Infinity | 0.110 | 1.514 | 55.2 |
| S13 |  | Infinity | 1.241 |  |  |
| S14 | Imaging Plane | Infinity | −0.020 |  |  |

TABLE 16

| Surface No. | S2 | S3 | S4 | S5 | S6 |
|---|---|---|---|---|---|
| k | 0.000 | 0.000 | 0.000 | 0.000 | 0.000 |
| A | −0.069 | 0.054 | 0.137 | 0.111 | 0.005 |
| B | −0.019 | −0.016 | −0.009 | 0.004 | 0.006 |
| C | −0.006 | 0.001 | 0.000 | −0.002 | −0.002 |
| D | −0.002 | −0.001 | −0.001 | −0.001 | 0.000 |
| E | −0.001 | 0.000 | 0.001 | 0.000 | 0.000 |
| F | 0.000 | 0.000 | 0.000 | 0.000 | 0.000 |
| G | 0.000 | 0.000 | 0.000 | 0.000 | 0.000 |
| H | 0.000 | 0.000 | 0.000 | 0.000 | 0.000 |
| J | 0.000 | 0.000 | 0.000 | 0.000 | 0.000 |
| L | 0.000 | 0.000 | 0.000 | 0.000 | 0.000 |
| M | 0.000 | 0.000 | 0.000 | 0.000 | 0.000 |
| N | 0.000 | 0.000 | 0.000 | 0.000 | 0.000 |
| O | 0.000 | 0.000 | 0.000 | 0.000 | 0.000 |
| P | 0.000 | 0.000 | 0.000 | 0.000 | 0.000 |
| Surface No. | S7 | S8 | S9 | S10 | S11 |
| k | 0.000 | 0.000 | 0.000 | 0.000 | 0.000 |
| A | 0.020 | −1.129 | −1.791 | −0.712 | −0.450 |
| B | 0.006 | 0.174 | 0.200 | 0.150 | 0.190 |
| C | −0.001 | −0.041 | −0.020 | −0.102 | −0.027 |
| D | 0.000 | −0.014 | 0.037 | 0.020 | 0.058 |
| E | 0.000 | 0.014 | 0.006 | −0.045 | −0.047 |
| F | 0.000 | 0.020 | 0.019 | 0.020 | −0.047 |
| G | 0.000 | 0.010 | 0.007 | 0.024 | −0.048 |
| H | 0.000 | 0.003 | 0.010 | 0.034 | −0.019 |
| J | 0.000 | −0.004 | 0.005 | 0.006 | −0.006 |
| L | 0.000 | −0.008 | 0.004 | −0.008 | 0.003 |
| M | 0.000 | −0.009 | 0.002 | −0.014 | 0.004 |
| N | 0.000 | −0.007 | 0.001 | −0.010 | 0.003 |
| O | 0.000 | −0.003 | 0.000 | −0.005 | 0.002 |
| P | 0.000 | −0.001 | 0.000 | −0.002 | 0.0 |

Figure 25:
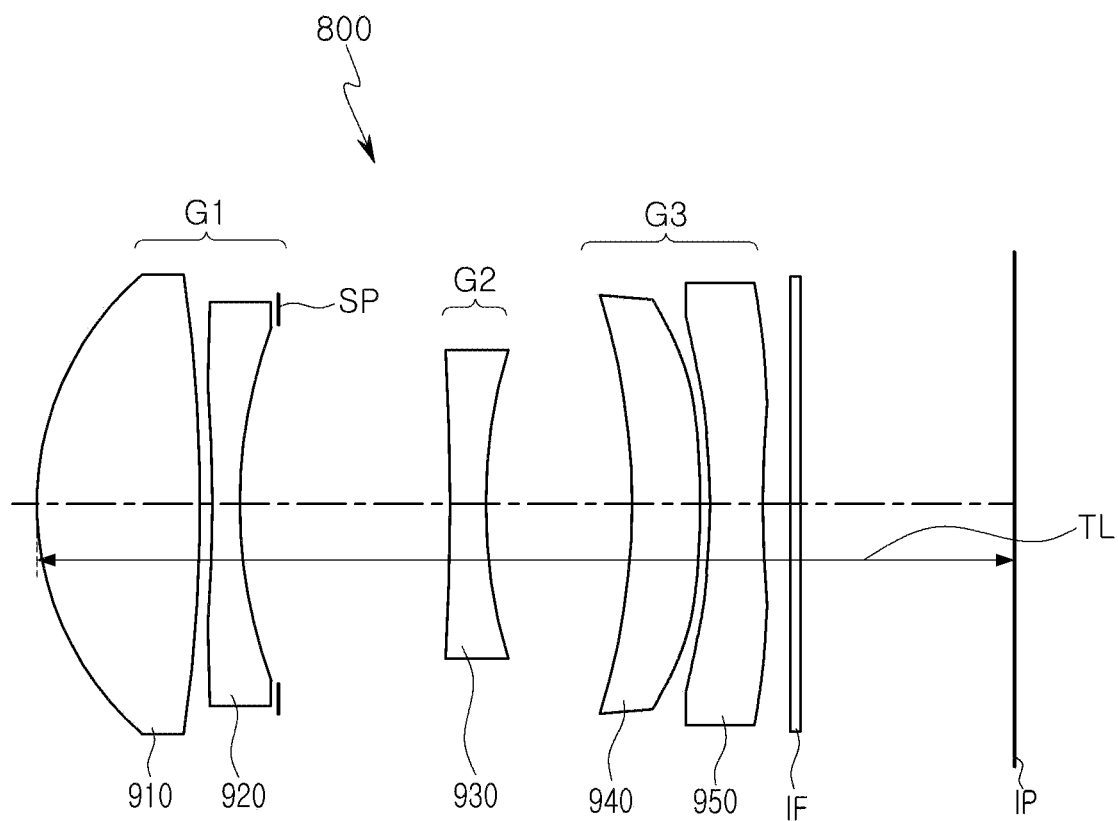
FIG. 25 is a view illustrating a ninth example of an optical imaging system.
Figure 26:
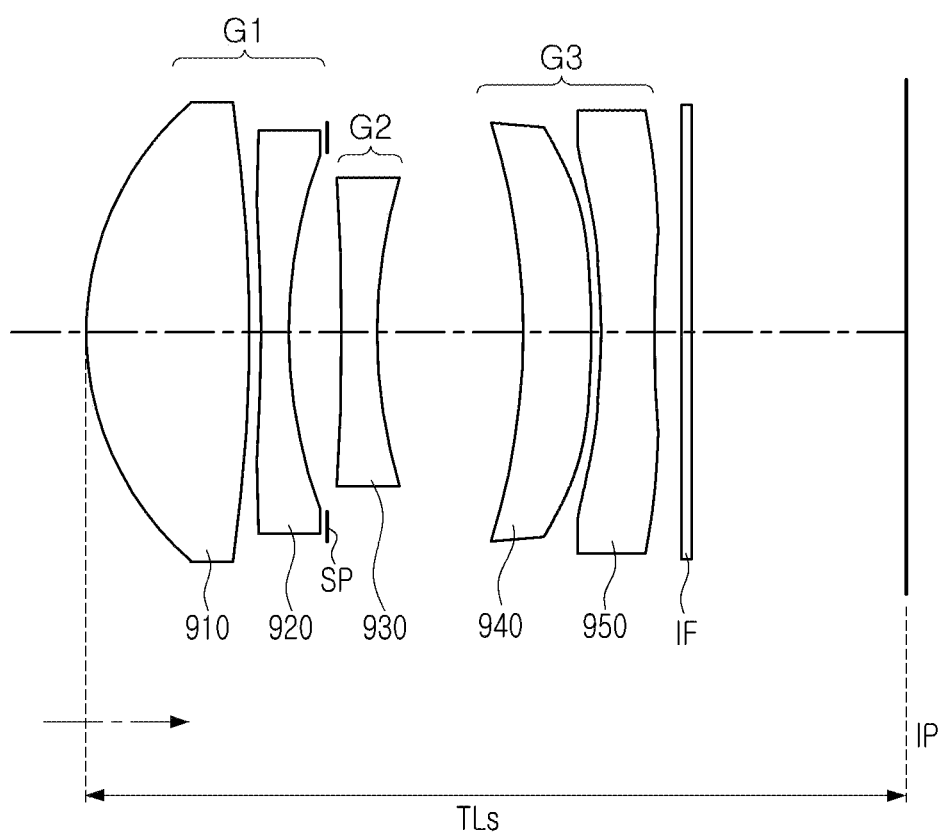
FIG. 26 is a view illustrating a contracted state of the optical imaging system illustrated in FIG. 25.
Figure 27:
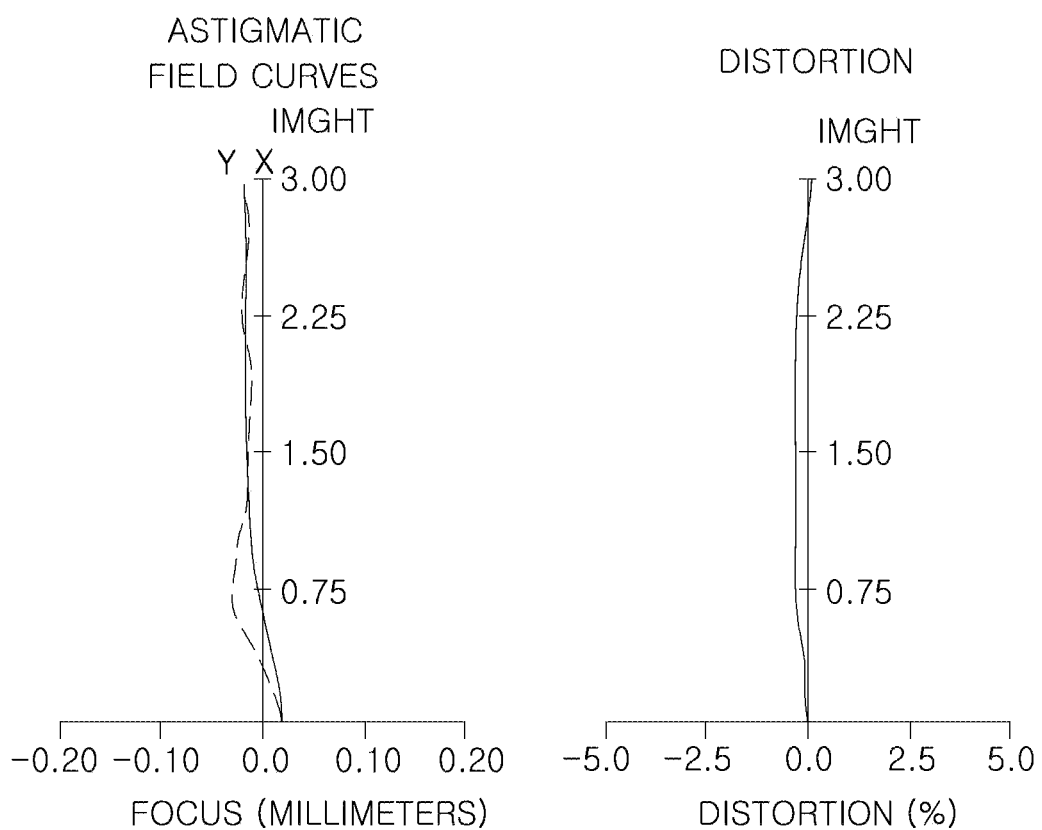
FIG. 27 is a view illustrating aberration curves of the optical imaging system illustrated in FIG. 25.

FIG. 25 is a view illustrating a ninth example of an optical imaging system, FIG. 26 is a view illustrating a contracted state of the optical imaging system illustrated in FIG. 25, and FIG. 27 is a view illustrating aberration curves of the optical imaging system illustrated in FIG. 25.

Referring to FIG. 25, an optical imaging system 900 may include a first lens 910, a second lens 920, a spacer SP, a third lens 930, a fourth lens 940, a fifth lens 950, a filter IF, and an imaging plane IP.

The first lens 910 may have a positive refractive power. The first lens 910 may have a convex object-side surface and a convex image-side surface. The second lens 920 may have a negative refractive power. The second lens 920 may have a concave object-side surface and a concave image-side surface. The third lens 930 may have a negative refractive power. The third lens 930 may have a concave object-side surface and a concave image-side surface. The fourth lens 940 may have a positive refractive power. The fourth lens 940 may have a concave object-side surface and a convex image-side surface. An inflection point may be formed on the object-side surface or the image-side surface of the fourth lens 940. The fifth lens 950 may have a negative refractive power. The fifth lens 950 may have a concave object-side surface and a concave image-side surface.

The optical imaging system 900 may include a plurality of lens groups. For example, the first lens 910, the second lens 920, and the spacer SP may constitute a first lens group G1, the third lens 930 may constitute a second lens group G2, and the fourth lens 940 and the fifth lens 950 may constitute a third lens group G3. An air gap between the first lens group G1 and the second lens group G2 may be a maximum air gap Gmax in the optical imaging system 900. In other words, the air gap between the second lens 920 and the third lens 930 may be greater than all other air gaps between the lenses in the optical imaging system 900.

As illustrated in FIG. 26, the first lens group G1 may be moved closer to the second lens group G2 without moving the second lens group G2 to decrease a length of the optical imaging system 900. Such a positional movement of the first lens group G1 may be selectively performed. For example, the first lens group G1 may be disposed to provide a maximum distance to the second lens group G2 in an active mode of the optical imaging system 900 (a mode of being capable of capturing an image), and may be disposed to provide a minimum distance to the second lens group G2 in an inactive mode of the optical imaging system 900 (a mode of being incapable of capturing an image). A length of the optical imaging system 900 (a distance between the object-side surface of the first lens 910 and the imaging plane IP) may vary depending on the positions of the first lens group G1 and the second lens group G2. For example, a length TL of the optical imaging system 900 in the active mode may be greater than a length TLs of the optical imaging system 900 in the inactive mode. Thus, the optical imaging system 900 may mitigate an issue in which a camera module protrudes outwardly from a mobile terminal device when the camera module is not being used.

Characteristics of the lenses and the other elements of the optical imaging system 900 are listed in Table 17 below, and aspherical constants of the surfaces of the lenses of the optical imaging system 900 are listed in Table 18 below.

A sum 2.487 of the bold values 0.433 and 2.054 in the Thickness/Distance column in Table 17 is the maximum air gap Gmax, which is the air gap between the first lens group G1 and the second lens group G2, and is also the air gap between the second lens 920 and the third lens 930. The bold value 1.655 in the Thickness/Distance column in Table 17 is the air gap between the second lens group G2 and the third lens group G3, and is also the air gap between the third lens 930 and the fourth lens 94.

TABLE 17

| Surface No. | Element | Radius of Curvature | Thickness/ Distance | Refractive Index | Abbe Number |
|---|---|---|---|---|---|
| S1 | | Infinity | 0.000 | | |
| S2 | First Lens | 3.35 | 1.925 | 1.544 | 56.1 |
| S3 | | −14.14 | 0.059 | | |
| S4 | Second Lens | −95.24 | 0.385 | 1.640 | 23.5 |
| S5 | | 6.83 | 0.433 | | |
| S6 | Spacer | Infinity | 2.054 | | |
| S7 | Third Lens | −9.53 | 0.385 | 1.567 | 37.4 |
| S8 | | 14.84 | 1.655 | | |
| S9 | Fourth Lens | −54.68 | 0.870 | 1.661 | 20.4 |
| S10 | | −9.99 | 0.119 | | |
| S11 | Fifth Lens | −14.56 | 0.666 | 1.535 | 56.1 |
| S12 | | 27.986822 | 0.262 | | |
| S13 | Filter | Infinity | 0.110 | 1.514 | 55.2 |
| S14 | | Infinity | 2.544 | | |
| S15 | Imaging Plane | Infinity | −0.020 | | |

TABLE 18

| Surface No. | S2 | S3 | S4 | S5 | S6 |
|---|---|---|---|---|---|
| k | −0.867 | 0.000 | 0.000 | −0.759 | 0.000 |
| A | 0.002 | −0.015 | −0.013 | 0.004 | 0.038 |
| B | 0.000 | 0.051 | 0.050 | −0.011 | −0.067 |
| C | 0.000 | −0.078 | −0.070 | 0.070 | 0.246 |
| D | 0.000 | 0.075 | 0.059 | −0.181 | −0.729 |
| E | 0.000 | −0.051 | −0.030 | 0.276 | 1.492 |
| F | 0.000 | 0.025 | 0.009 | −0.277 | −2.146 |
| G | 0.000 | −0.009 | 0.000 | 0.195 | 2.203 |
| H | 0.000 | 0.002 | −0.001 | −0.098 | −1.629 |
| J | 0.000 | −0.001 | 0.000 | 0.035 | 0.867 |
| L | 0.000 | 0.000 | 0.000 | −0.009 | −0.328 |
| M | 0.000 | 0.000 | 0.000 | 0.002 | 0.086 |
| N | 0.000 | 0.000 | 0.000 | 0.000 | −0.015 |
| O | 0.000 | 0.000 | 0.000 | 0.000 | 0.002 |
| P | 0.000 | 0.000 | 0.000 | 0.000 | 0.000 |

| Surface No. | S7 | S8 | S9 | S10 | S11 |
|---|---|---|---|---|---|
| k | 0.000 | 0.000 | 0.576 | −7.562 | 0.000 |
| A | 0.035 | 0.004 | −0.024 | −0.062 | −0.036 |
| B | 0.019 | −0.011 | 0.022 | 0.035 | 0.015 |
| C | −0.140 | 0.022 | −0.017 | −0.006 | −0.003 |
| D | 0.388 | −0.035 | 0.012 | −0.004 | 0.000 |
| E | −0.692 | 0.037 | −0.009 | 0.004 | 0.001 |
| F | 0.848 | −0.027 | 0.005 | −0.002 | 0.000 |
| G | −0.731 | 0.014 | −0.002 | 0.000 | 0.000 |
| H | 0.449 | −0.005 | 0.001 | 0.000 | 0.000 |
| J | −0.196 | 0.001 | 0.000 | 0.000 | 0.000 |
| L | 0.060 | 0.000 | 0.000 | 0.000 | 0.000 |
| M | −0.013 | 0.000 | 0.000 | 0.000 | 0.000 |
| N | 0.002 | 0.000 | 0.000 | 0.000 | 0.000 |
| O | 0.000 | 0.000 | 0.000 | 0.000 | 0.000 |
| P | 0.000 | 0.000 | 0.000 | 0.000 | 0.000 |

Table 19 below lists values of parameters of the first to ninth examples of the optical imaging system described above, and Table 20 below lists values of conditional expressions of the first to ninth examples of the optical imaging systems described above.

TABLE 19

| Parameter | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| TL | 8.801 | 8.644 | 8.830 | 8.801 | 8.950 | 8.836 | 8.603 | 7.739 | 11.447 |
| TLs | 6.701 | 6.744 | 6.530 | 6.851 | 7.050 | 6.424 | 6.621 | 5.736 | 9.003 |
| Gmax | 2.200 | 2.000 | 2.400 | 2.050 | 2.000 | 2.512 | 2.082 | 2.103 | 2.054 |
| BFL | 1.352 | 1.538 | 1.081 | 1.345 | 1.340 | 0.990 | 1.075 | 1.431 | 2.896 |
| Fno | 1.91 | 2.30 | 1.80 | 1.89 | 2.31 | 1.89 | 2.31 | 2.45 | 2.47 |
| IMGHT | 6.00 | 6.00 | 6.00 | 6.25 | 6.00 | 6.00 | 6.25 | 3.00 | 3.00 |
| f | 7.237 | 7.584 | 7.049 | 6.952 | 7.661 | 6.992 | 6.660 | 11.421 | 13.216 |
| f1 | 6.900 | 5.566 | 8.687 | 7.457 | 7.328 | 8.397 | 7.325 | 3.719 | 5.162 |
| f2 | −16.184 | −9.859 | −19.196 | −24.459 | −53.520 | −17.561 | −22.223 | −8.084 | −9.864 |
| f3 | −27.638 | 17.581 | 24.033 | −54.434 | −12.814 | 24.886 | −66.735 | −11.180 | −10.112 |
| f4 | 66.899 | −87.472 | −27.880 | −14.066 | −32.849 | −29.748 | −15.413 | −6.167 | 18.159 |
| f5 | 7.840 | 13.296 | −12.671 | 5.412 | 15.507 | −14.876 | 312.670 | 10.232 | −17.731 |
| f6 | −7.011 | −6.516 | 4.628 | 99.796 | 16.524 | −144.233 | 5.555 | — | — |
| f7 | — | — | −5.912 | −6.479 | 63.391 | 4.718 | 60.345 | — | — |
| f8 | — | — | — | — | — | −5.868 | −5.770 | — | — |

TABLE 20

| Conditional Expression | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| TLs/TL | 0.7614 | 0.7802 | 0.7395 | 0.7784 | 0.7877 | 0.7270 | 0.7696 | 0.7412 | 0.7865 |
| Gmax/TL | 0.2500 | 0.2314 | 0.2718 | 0.2329 | 0.2235 | 0.2843 | 0.2420 | 0.2717 | 0.2173 |
| f/f2 + f/f3 | −0.7090 | −0.3379 | −0.0739 | −0.4119 | −0.7410 | −0.1172 | −0.3995 | −2.4343 | −2.6468 |
| TL/f | 1.2161 | 1.1398 | 1.2527 | 1.2660 | 1.1683 | 1.2637 | 1.2917 | 0.6776 | 0.8661 |
| Nd2 + Nd3 | 3.2850 | 3.1810 | 3.2150 | 3.3420 | 3.1810 | 3.2060 | 3.2060 | 3.2280 | 3.2070 |

TABLE 20-continued

| Conditional Expression | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| BFL/f | 0.1868 | 0.2028 | 0.1534 | 0.1935 | 0.1749 | 0.1416 | 0.1614 | 0.1253 | 0.2191 |
| D12/f | 0.0287 | 0.0293 | 0.0062 | 0.0157 | 0.0309 | 0.0162 | 0.0209 | 0.0088 | 0.0045 |
| R1/f | 0.4214 | 0.3389 | 0.4469 | 0.4632 | 0.3381 | 0.4505 | 0.4730 | 0.1918 | 0.2535 |

Figure 28:
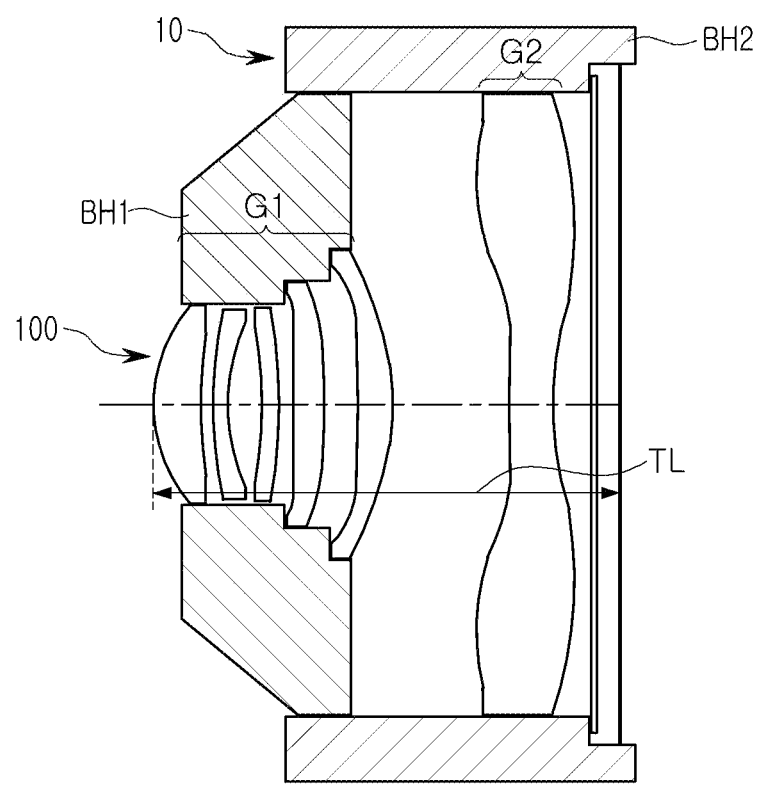
FIG. 28 is a cross-sectional view of a first example of a camera module including the first example of the optical imaging system illustrated in FIG. 1.
Figure 29:
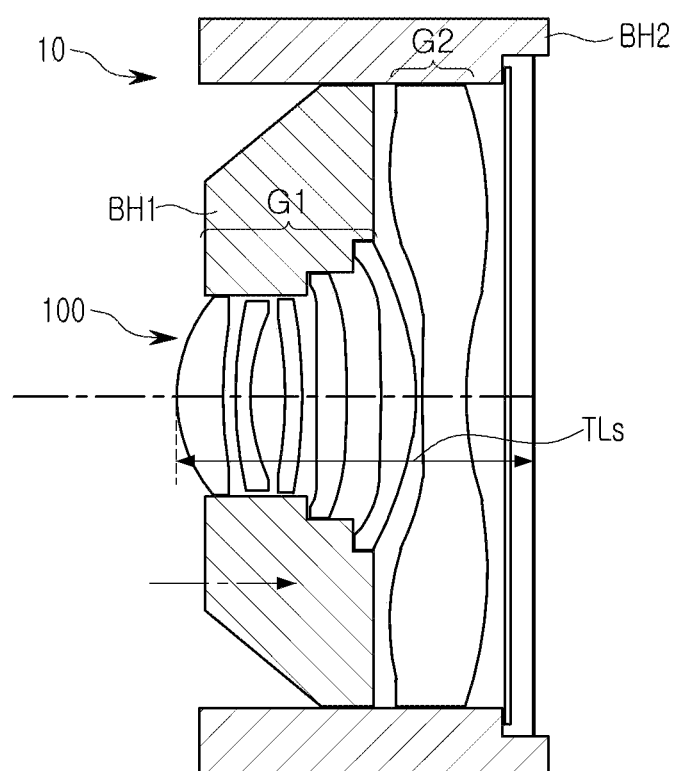
FIG. 29 is a cross-sectional view of the camera module illustrated in FIG. 28 in a contracted state.
Figure 30:
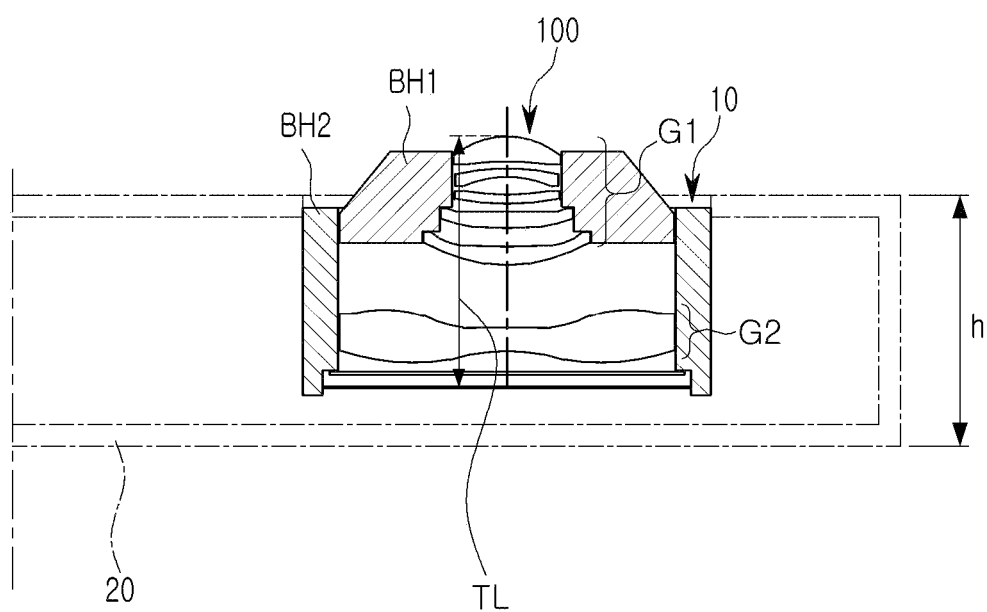
FIG. 30 is a cross-sectional view of a first example of a mobile terminal device including the camera module illustrated in FIG. 28.
Figure 31:
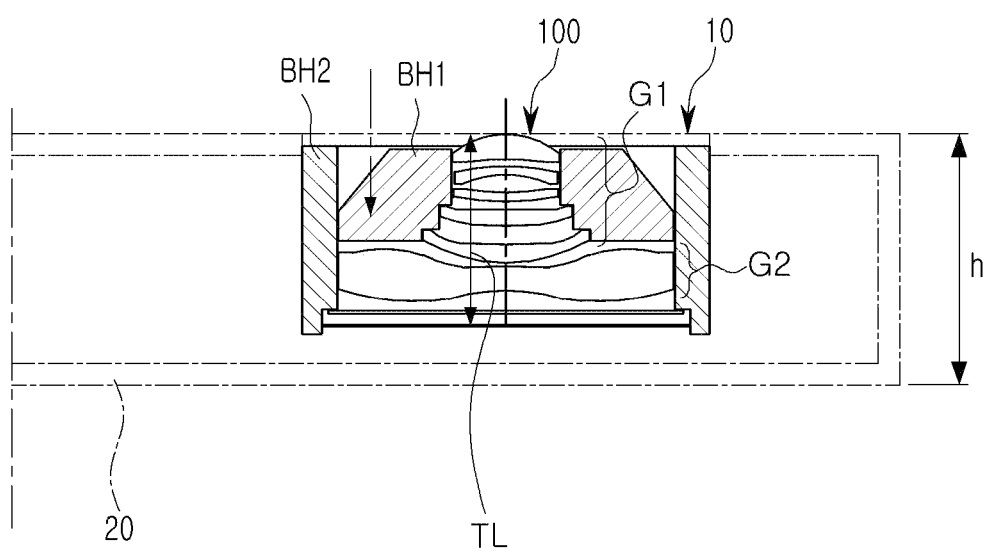
FIG. 31 is a cross-sectional view of the mobile terminal device illustrated in FIG. 30 with the camera module in a contracted state.

FIG. 28 is a cross-sectional view of a first example of a camera module including the first example of the optical imaging system illustrated in FIG. 1, FIG. 29 is a cross-sectional view of the camera module illustrated in FIG. 28 in a contracted state, FIG. 30 is a cross-sectional view of a first example of a mobile terminal device including the camera module illustrated in FIG. 28, and FIG. 31 is a cross-sectional view of the mobile terminal device illustrated in FIG. 30 with the camera module in a contracted state.

Referring to FIGS. 28 and 29, a camera module 10 may include one of the optical imaging systems 100 to 700 described above. For example, the camera module 10 may include the optical imaging system 100.

The camera module 10 may include a plurality of lens barrels BH1 and BH2. For example, the camera module 10 may include a first lens barrel BH1 and a second lens barrel BH2. The lens barrels BH1 and BH2 may be configured to accommodate the optical imaging system 100 therein. For example, the first lens barrel BH1 may accommodate the first lens group G1 of the optical imaging system 100 therein, and the second lens barrel BH2 may accommodate the second lens group G2 of the optical imaging system 100 therein. At least one of the lens barrels BH1 and BH2 may be configured to move in an optical axis direction. For example, the first lens barrel BH1 may move toward an imaging plane in the optical axis direction as illustrated in FIG. 29 so that a length of the camera module 10 may be decreased. For example, the length of the camera module 10 may be decreased by a movement displacement TL-TLs of the first lens barrel BH1.

Referring to FIGS. 30 and 31, the camera module 10 may be mounted in a mobile terminal device 20. The camera module 10 may be mounted on one surface of the mobile terminal device 20. The camera module 10 may protrude from the one surface of the mobile terminal device 20 as illustrated in FIG. 30, or may be retracted into the mobile terminal 20 as illustrated in FIG. 31. For example, the camera module 10 may protrude from the one surface of the mobile terminal 20 in an image-capturing mode, and may be retracted into the mobile terminal device 20 in an inactive mode. The camera module 10 may have different lengths in the image-capturing mode and the inactive mode. For example, a length TL of the camera module 10 in the image-capturing mode may be substantially equal to a thickness h of the mobile terminal device 20. Conversely, a length TLs of the camera module 10 in the inactive mode may be smaller than the thickness h of the mobile terminal device 20.

In the camera module 10, since a length of the camera module 10 from an object-side surface of a first lens to an imaging plane is increased from TLs to TL in the imaging-capture mode, a sufficient focal length for implementing a high resolution may be obtained. In addition, since the camera module 10 is fully retracted into the mobile terminal device 20 in the inactive mode, a front portion of the camera module 10 may be protected from an external impact.

Figure 32:
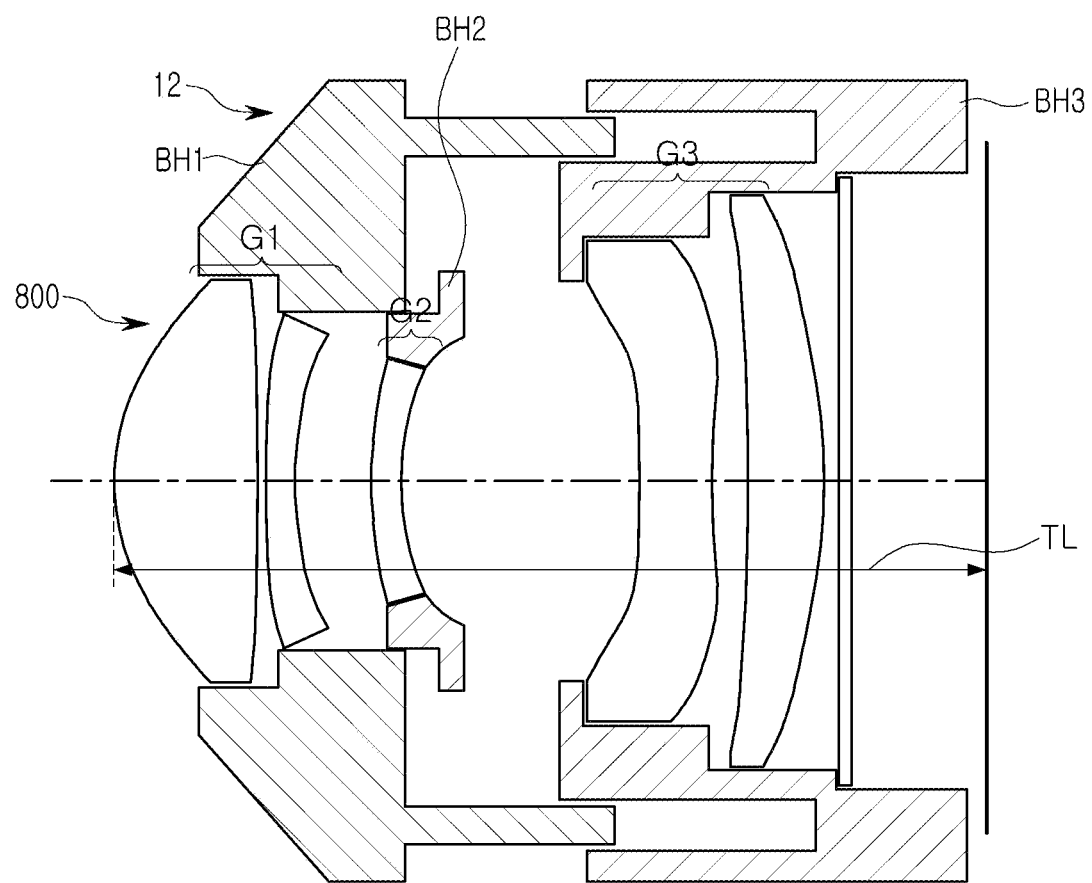
FIG. 32 is a cross-sectional view of a second example of a camera module including the eighth example of the optical imaging system illustrated in FIG. 22.
Figure 33:
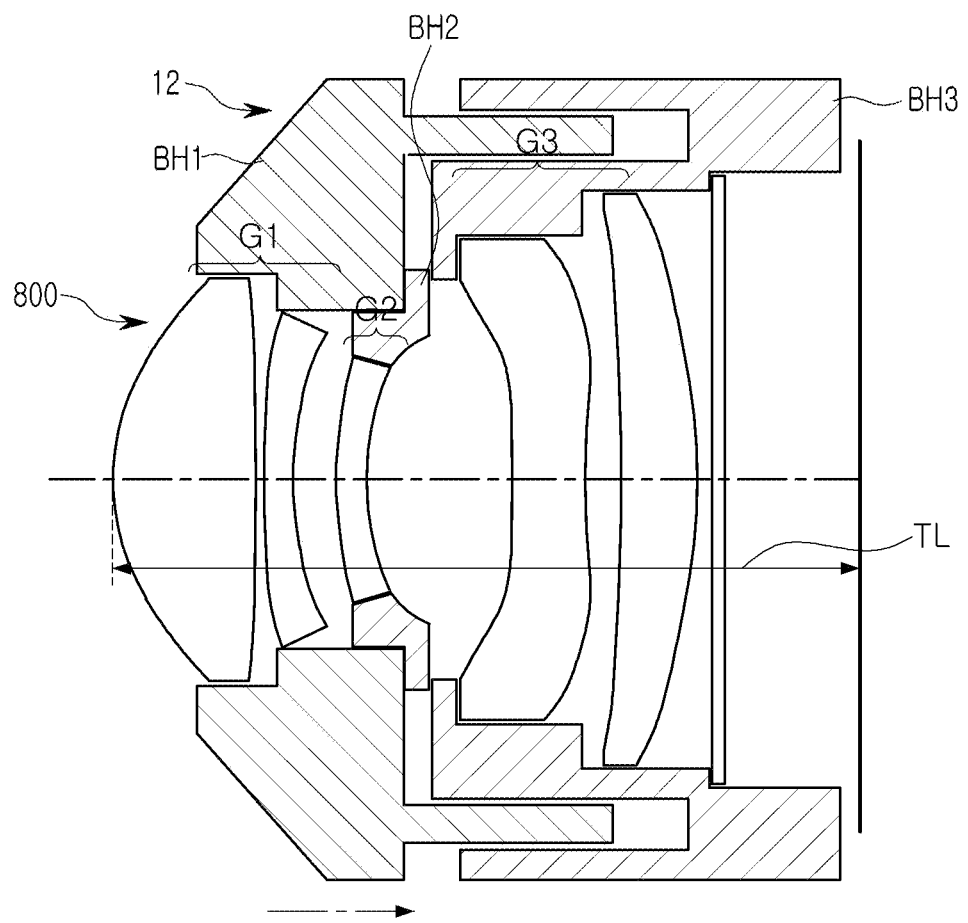
FIG. 33 is a cross-sectional view of the camera module illustrated in FIG. 32 in a contracted state.
Figure 34:
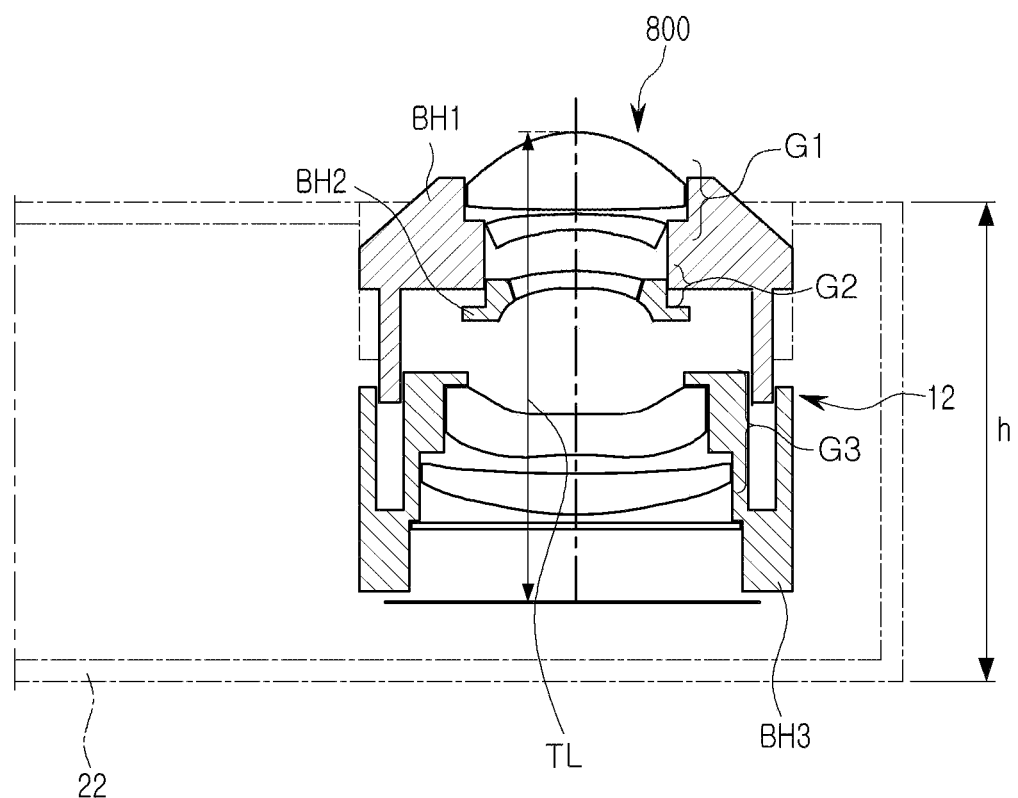
FIG. 34 is a cross-sectional view of a second example of a mobile terminal device including the camera module illustrated in FIG. 33.
Figure 35:
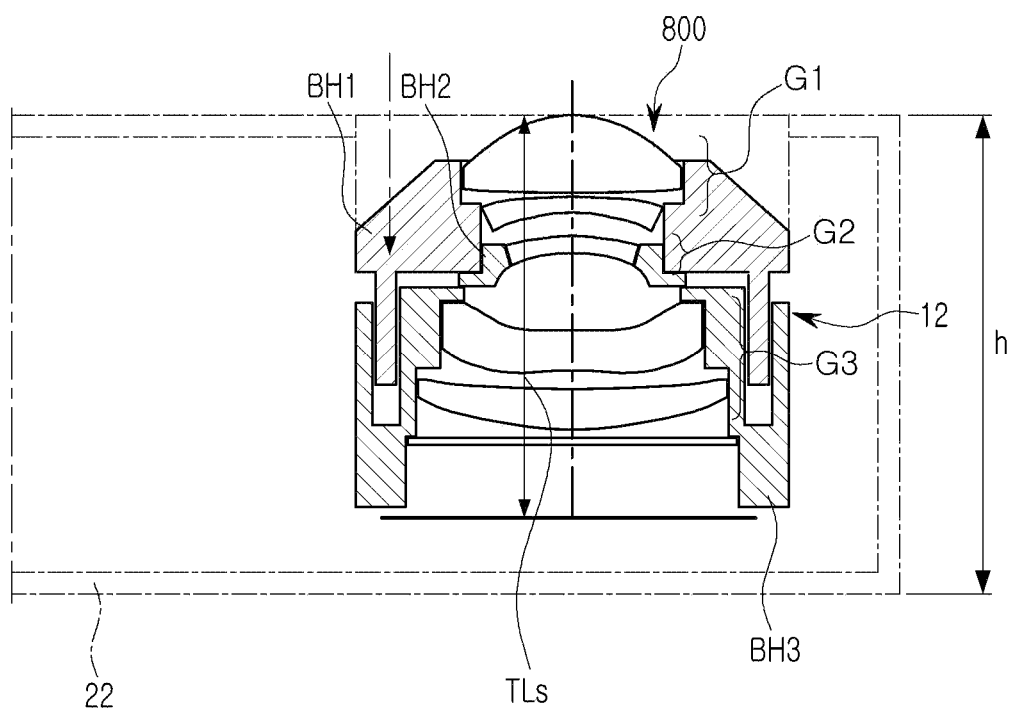
FIG. 35 is a cross-sectional view of the mobile terminal device illustrated in FIG. 34 with the camera module in a contracted state.

FIG. 32 is a cross-sectional view of a second example of a camera module including the eighth example of the optical imaging system illustrated in FIG. 22, FIG. 33 is a cross-sectional view of the camera module illustrated in FIG. 32 in a contracted state, FIG. 34 is a cross-sectional view of a second example of a mobile terminal device including the camera module illustrated in FIG. 33, and FIG. 35 is a cross-sectional view of the mobile terminal device illustrated in FIG. 34 with the camera module in a contracted state.

Referring to FIGS. 32 and 33, a camera module 12 may include one of the optical imaging systems 800 and 900. For example, the camera module 12 may include the optical imaging system 800.

The camera module 12 may include a plurality of lens barrels BH1, BH2, and BH3. For example, the camera module 12 may include a first lens barrel BH1, a second lens barrel BH2, and a third lens barrel BH3. The lens barrels BH1, BH2, and BH3 may be configured to accommodate the optical imaging system 800 therein. For example, the first lens barrel BH1 may accommodate the first lens group G1 of the optical imaging system 800 therein, the second lens barrel BH2 may accommodate the second lens group G2 of the optical imaging system 800 therein, and the third lens barrel BH3 may accommodate the third lens group G3 of the optical imaging system 800 therein. At least one of the lens barrels BH1, BH2, and BH3 may be configured to move in an optical axis direction. For example, the first lens barrel BH1 and the second lens barrel BH2 may move toward an imaging plane in the optical axis direction as illustrated in FIG. 33 so that a length of the camera module 12 may be decreased. For example, the length of the camera module 12 may be decreased by a movement displacement TL-TLs of the first lens barrel BH1 and the second lens barrel BH2.

Referring to FIGS. 34 and 35, the camera module 12 may be mounted in a mobile terminal device 22. The camera module 12 may be mounted on one surface of the mobile terminal device 22. The camera module 12 may protrude from the one surface of the mobile terminal device 22 as illustrated in FIG. 34, or may be retracted into the mobile terminal device 22 as illustrated in FIG. 35. For example, the camera module 12 may protrude from the one surface of the mobile terminal device 22 in an image-capturing mode, and may be retracted into the mobile terminal device 22 in an inactive mode. The camera module 12 may have different lengths in the image-capturing mode and the inactive mode. For example, a length TL of the camera module 12 in the image-capturing mode may be substantially equal to a thickness h of the mobile terminal device 22. Conversely, a length TLs of the camera module 12 in the inactive mode may be smaller than the thickness h of the mobile terminal device 22.

In the camera module 12, since a length of the camera module 12 from an object-side surface of a first lens to an imaging plane is increased from TLs to TL in the image-capturing mode, a sufficient focal length for implementing a high resolution may be obtained. In particular, since the camera module 12 may increase a focal length by a movement displacement of the first lens barrel BH1 and the second lens barrel BH2, long-range image capturing or focal power adjustment may be performed. In addition, since the camera module 12 is fully retracted into the mobile terminal device 22 in the inactive mode, a front portion of the camera module 12 may be protected from an external impact.

The examples described provide an optical imaging system having an adjustable length, a camera module including the optical imaging system, and a mobile electronic device including the camera module.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens group disposed on an optical axis of the optical imaging system at an object side of the optical imaging system;
a second lens group disposed on the optical axis between the first lens group and an imaging plane of the optical imaging system; and
a third lens group disposed on the optical axis between the second lens group and the imaging plane,
wherein the first lens group and the second lens group are configured to be movable between respective first positions at which a first length of the optical imaging system along the optical axis from an object-side surface of the first lens group to the imaging plane is TL, and respective second positions at which a second length of the optical imaging system along the optical axis from the object-side surface of the first lens group to the imaging plane is TLs, and
TL and TLs satisfy the following conditional expression:
$$0.70 < TLs/TL < 0.79.$$

2. The optical imaging system of claim 1, wherein the first lens group and the second lens group being disposed at the respective first positions enable the optical imaging system to form an image of an object on the imaging plane, and
the first lens group and the second lens group being disposed at the respective second positions prevent the optical imaging system from being able to form the image of the object on the imaging plane.

3. The optical imaging system of claim 1, wherein the optical imaging system comprises a plurality of lenses sequentially disposed along the optical axis from the object side of the optical imaging system toward the imaging plane and divided into the first lens group, the second lens group, and the third lens group,
the plurality of lenses are separated from each other by respective air gaps along the optical axis, and
an air gap between the second lens group and the third lens group at the respective first positions of the first lens group and the second lens group is a maximum air gap Gmax among all of the air gaps between the plurality of lenses and satisfies the following conditional expression:
$$1.5 \text{ mm} < Gmax.$$

4. The optical imaging system of claim 1, wherein the first lens group comprises a total of two lenses,
the second lens group comprises a total of one lens, and
the third lens group comprises a total of two lenses.

5. A camera module comprising:
the optical imaging system of claim 1;
a first lens barrel in which the first lens group is disposed;
a second lens barrel in which the second lens group is disposed; and
a third lens barrel in which the third lens group is disposed,
wherein the first lens barrel and the second lens barrel are configured to be movable to move the first lens group and the second lens group between the respective first positions and the respective second positions.

6. A mobile terminal device comprising the camera module of claim 5.

* * * * *